United States Patent [19]

Fujiwara

[11] Patent Number: 4,761,643
[45] Date of Patent: Aug. 2, 1988

[54] IMAGE DATA STORING SYSTEM
[75] Inventor: Fukumi Fujiwara, Kanagawa, Japan
[73] Assignee: Fuji Xerox Co., Ltd., Tokyo, Japan
[21] Appl. No.: 838,448
[22] Filed: Mar. 11, 1986

Related U.S. Application Data

[63] Continuation of Ser. No. 499,662, May 31, 1983, abandoned.

[30] Foreign Application Priority Data

May 31, 1982 [JP] Japan ................................. 57-91406
Jan. 14, 1983 [JP] Japan ................................. 58-3416
Jan. 14, 1983 [JP] Japan ................................. 58-3418

[51] Int. Cl.$^4$ ............................................. G09G 1/00
[52] U.S. Cl. ................................. 340/723; 340/747; 340/750; 340/798
[58] Field of Search ............... 340/723, 724, 725, 726, 340/744, 747, 789, 798, 799, 800, 750; 364/521

[56] References Cited

U.S. PATENT DOCUMENTS 3,215,773 11/1965 Chatten et al. .
3,921,135 11/1975 Komaru et al. .
4,125,873 11/1978 Chesarek ........................... 340/747
4,186,415 1/1980 Takayama .
4,203,107 5/1980 Lovercheck ....................... 340/744
4,249,172 2/1981 Watkins et al. .................... 340/758
4,298,931 11/1981 Tachiuchi et al. ................. 340/799
4,308,532 12/1981 Murphy ............................. 340/723
4,368,466 1/1983 Dwire ............................... 340/799
4,383,296 5/1983 Sander .............................. 340/799
4,404,554 9/1983 Tweedy, Jr. et al. .............. 340/750
4,412,294 10/1983 Watts et al. ....................... 340/726
4,468,662 8/1984 Tanaka .............................. 340/799
4,496,976 1/1985 Swanson et al. ................... 340/798

Primary Examiner—Gerald L. Brigance
Assistant Examiner—Jeffery A. Brier
Attorney, Agent, or Firm—Sughrue, Mion, Zinn, Macpeak, and Seas

[57] ABSTRACT

An image data storage system and an apparatus and a method for compressing image data including a map memory and a data memory. The map memory contains a plurality of memory regions while the data memory contains a plurality of memory areas. A pointer is stored in each memory region of the map memory, one pointer for each corresponding unit of input data. For units of input image data containing other than all "0"s, the data is stored in a corresponding image data region of the data memory. On the other hand, for all image units containing all "0"s (completely white), the pointers point to a single memory data in the data memory which contains all "0"s.

8 Claims, 22 Drawing Sheets

FIG. 11A
FIG. 11B
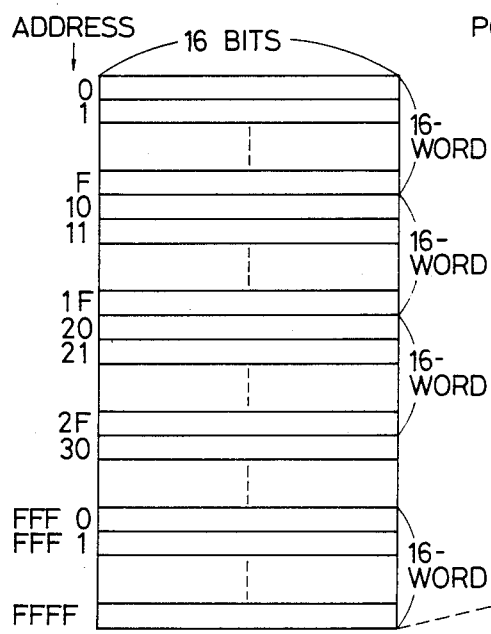
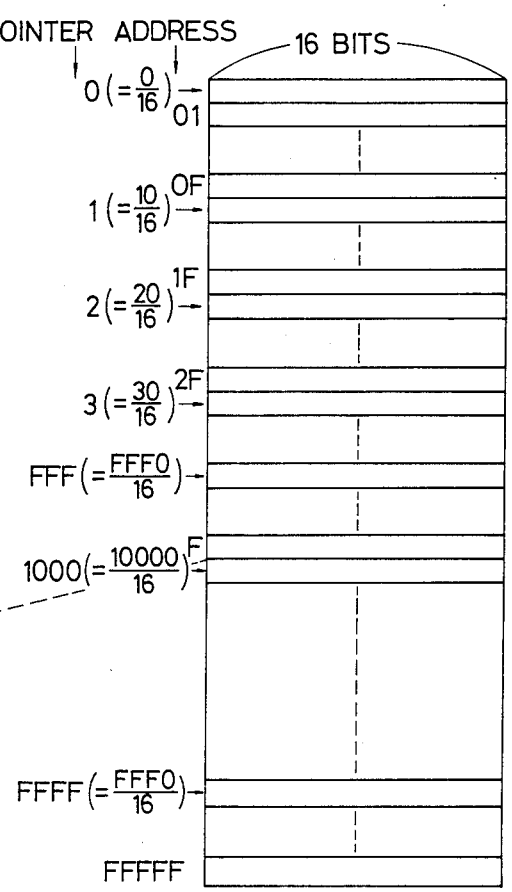

FIG. 15B—1
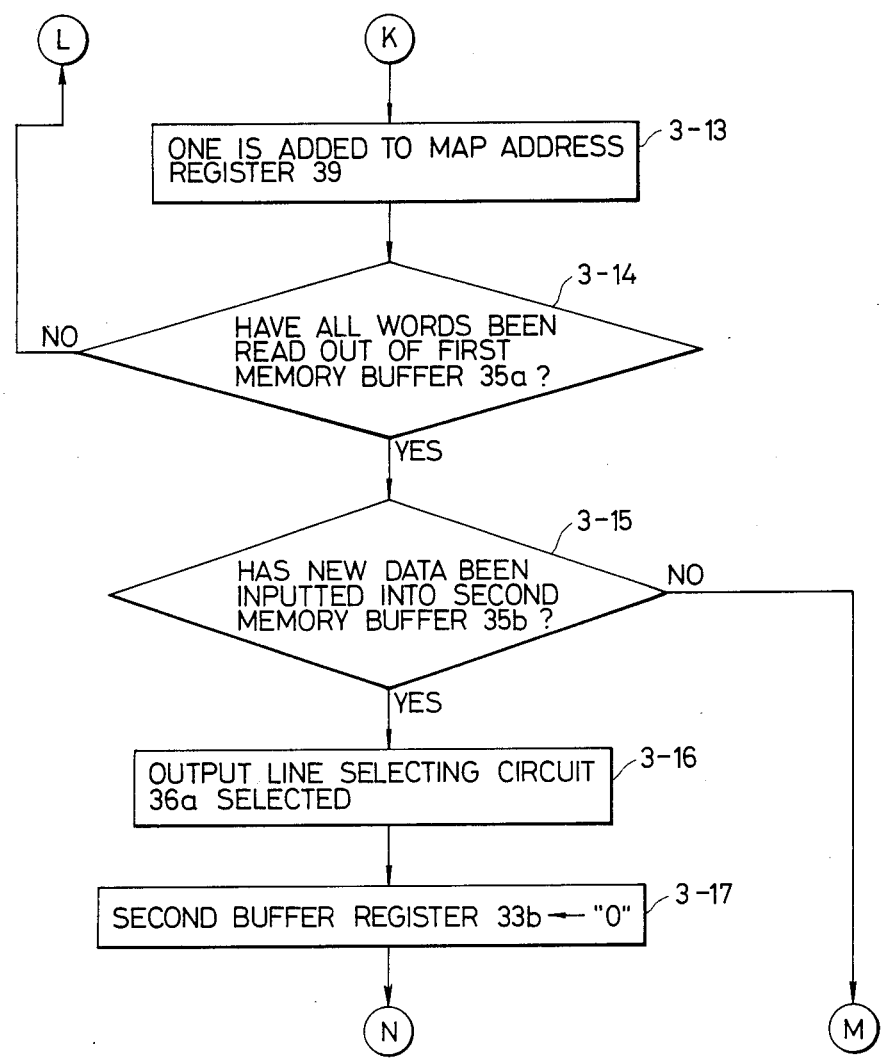

IMAGE DATA STORING SYSTEM

This is a continuation of application Ser. No. 499,662, filed May 31, 1983, now abandoned.

BACKGROUND OF THE INVENTION

The present invention relates to image data storage systems. More particularly, the invention relates to an image data storage system in which binary (black and white) or multi-valued (shaded image) image data is stored in a memory of relatively small capacity and in which data can be easily inputted, outputted and edited.

Heretofore, an image data storage system has been employed in which image data outputted serially (element by element) from a sensor array by electronically scanning the array in a main scanning direction is stored directly. In another known system, an image data for one line or a plurality of lines in the main scanning direction is stored in advance, and thereafter the stored data is compressed one-dimensionally prior to storage. The former system in which the image data is stored directly suffers from a drawback in that the required memory capacity is relatively large. On the other hand, the latter system, for example, as shown in U.S. Pat. No. 4,383,296, issued to Sander, in which the data is compressed one dimensionally is advantageous with regard to storage capacity and in the case where the data is to be communicated externally, but is disadvantageous in that it is rather difficult to use in editing pictures. The term "editing" as used here means that parts of a picture are moved or overlapped, or an image is rotated, or reduced or enlarged.

Accordingly, an object of the invention is to provide an image data storage system in which image data can be stored in a memory of relatively small capacity and the data can be easily edited.

Another object of the invention is to provide an image data storage system in which editing functions wherein parts of an image are moved or overlapped, or an image is rotated, reduced, or enlarged, can be performed with high speed and independently of parts of the image.

SUMMARY OF THE INVENTION

In accordance with these and other objects of the invention, there is provided an image data storage system in which each image is two-dimensionally divided divided a plurality of p×q units (matrix regions), each composed of a submatrix of M×N dots, and a map memory is two-dimensionally divided into a plurality of memory regions (p×q), each of which corresponds to the image units (p×q) obtained by two-dimensionally dividing an image itself. More specifically, if an image unit contains no image information, data representing this fact is stored in the corresponding memory region in the map memory, while if image information is present, a pointer to a location in a data memory at which the image information of the unit is entirely stored in the corresponding memory region.

More specifically, the invention provides an image data conversion system which includes a buffer to which input image data is applied in units of words, first means for detecting the end of each line in the input image data, second means for counting pulses of the output of the first means to thus provide a count of the number of lines in the image, a map memory which is addressed each time a word of input image data is applied, a data memory having memory areas which correspond with pointers stored in the map memory, a pointer register to which the data of the map memory are inputted, and third means for setting a new pointer in the pointer register. When the data of a word applied to the buffer includes data other than all "0"s and the data of the map memory which has been inputted into the pointer register is all "0"s or some other predetermined particular value, a new pointer is stored in a main memory while the word is written into the data memory with the pointer as an address. When the data of a word applied to the buffer includes data other than "0" and the data of the map memory which has been inputted into the pointer register is a pointer, the word is written into the data memory with the pointer as an address. When the data of a word applied to the buffer is all "0"s, the processing for the next word is effected without accessing the map memory and data memory.

A further feature of the invention resides in a picture data conversion apparatus which comprises first and second memory buffers each having a capacity of $2^M 33$ N, with $2^M \geq P$, where P is the number of words in each line of image data and one word×N lines forms one unit; first and second buffer address registers for addressing the first and second memory buffers, respectively; a map memory in which pointers indicating whether the data of corresponding image units read out of the first or second memory buffers are all "0"s or not are stored; and a data memory in which, when the data of a unit is not all "0"s, the data of the unit is written into a corresponding memory area with the pointer as an address. While input image data is being written in the direction of continuation of memory addresses in one of the first and second memory buffers, N words are continuously read, with every $2^M$ addresses, out of the other memory buffer, whereby the image data is compressed.

Another feature of the invention resides in the fact that, while N words are being continuously written, with every $2^M$ addresses, in one of the first and second buffers, data is being read, in the direction of continuation of memory addresses out of the other memory buffer.

BRIEF DESCRIPTION OF THE DRAWINGS

FIGS. 11A and 11B are explanatory diagrams for a data memory in a system of the invention;

DESCRIPTION OF THE PREFERRED EMBODIMENTS

The invention will now be described in detail with reference to the accompanying drawings.

Figure 1:
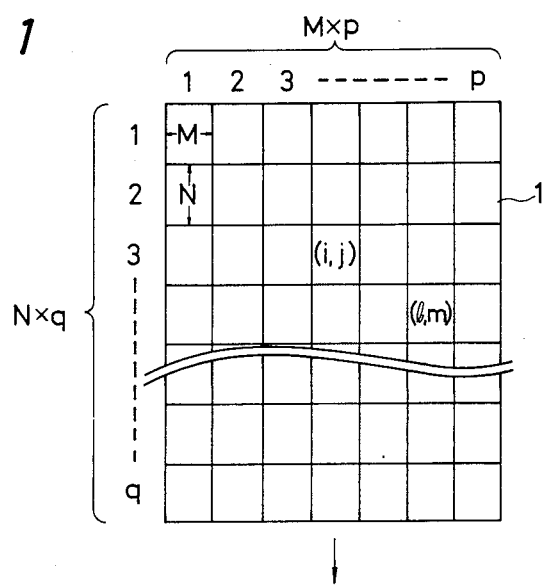
FIGS. 1 and 4 are explanatory diagrams showing methods of two-dimensionally dividing images into units.
Figure 2:
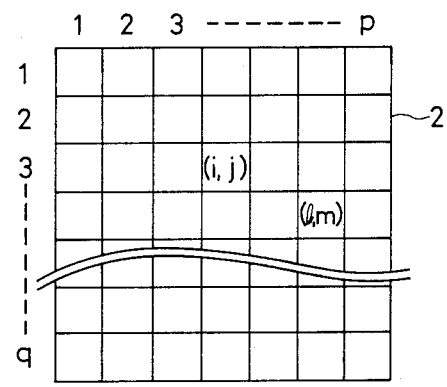
FIGS. 2 and 5 are explanatory diagrams showing examples of a map memory.

FIG. 1 is an explanatory diagram showing the division of an image into units. In FIG. 1, reference numeral 1 designates an entire image. The image is two-dimensionally divided into p×q units with the horizontal side of the image 1 containing M×p dots and the vertical side containing N×q dots. FIG. 2 is an explanatory diagram showing an example of a map memory. As is apparent from FIG. 2, the map memory 2 is two-dimensionally divided into p×q memory regions corresponding to pxq image units obtained by two-dimensionally dividing an image itself as shown in FIG. 1.

The following data is stored in the various image unit memory regions of the map memory:

(1) If the image data of an image unit contains all "0"s (completely white - no image information), "0"s (or some other predetermined number is desired) are stored in the corresponding memory region.

(2) If the image data of an image unit is not composed of all "0"s, there is stored a pointer to a data memory location at which the complete image data of the corresponding unit is stored. Alternatively, a link address, for instance, the top address of a data memory, may be stored.

Figure 3:
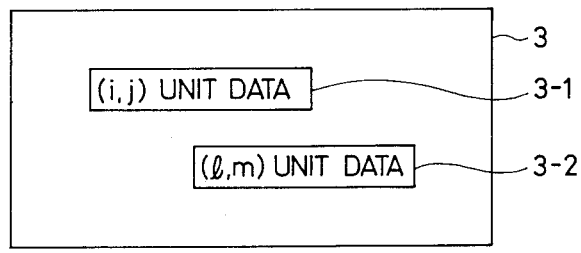
FIGS. 3 and 6 are explanatory diagrams showing examples of a data memory.

FIG. 3 is an explanatory diagram showing the arrangement of the data memory. The data memory 3 stores the complete image data of image units which do not contain all "0"s. Each such unit contains M×N dots. As stated above, addresses for this data are specified by the map memory. For instance in the case where the image units (i,j) and (l,m) include image information other than all "0"s, the data representing the states of all the M×N dots which make up the image is stored in image data memory areas 3-1 and 3-2 in the data memory, respectively, in FIG. 3. The pointers indicating these memory areas in the data memory are stored in the memory regions (i,j) and l,m) of the map memory.

As is clear from the above description, each of the memory regions of the map memory 2 must coincide in position with each of the image units of image data. The data memory areas of the data memory 3 of course may, however, be arranged in any order as long as they correspond with the various memory regions of the map memory.

Figure 4:
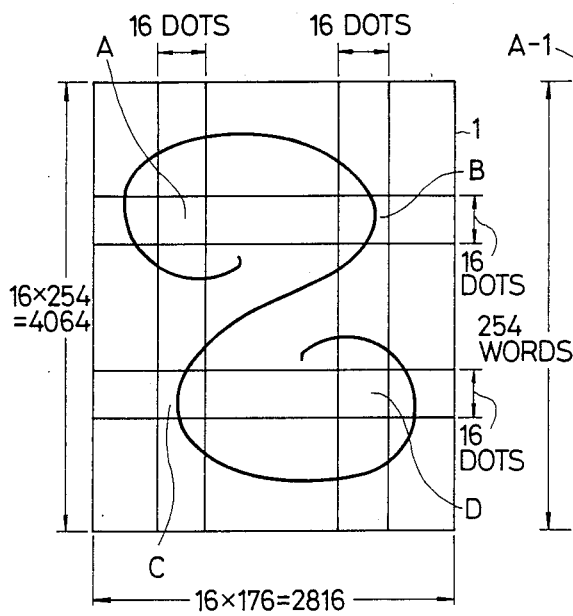
Figure 5:
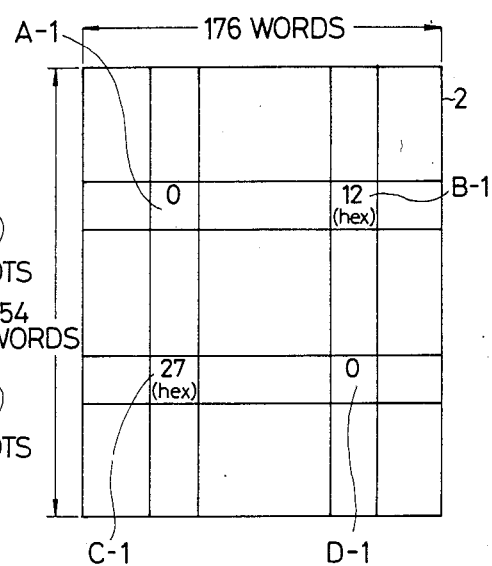

The image data storage system according to the invention will now be described in more detail with reference to an example in which a binary (black and white) B4 size image is read with a resolution of 11 lines/mm and then compressed according to the above-described system in units of 16 dots×16 dots and stored in a memory having 16 bits/word. The image 1 in this example is made up of 4064 dots×2816 dots, or 254×176 units, as shown in FIG. 4. Therefore, a map memory 2 having a storage capacity of 254×176 words (one memory unit being equivalent to one word) as shown in FIG. 5 is provided. At the maximum, that is, in the case where none of the image units are "white", the data memory requires a capacity of 715K words.

The pointers to the data memory, which are two-dimensionally in the various memory regions of the map memory 2, preferably point to "top" addresses that is, top positions of stacks of stored image data, each of which contains the image data of an entire image unit. Sixteen bits/word is insufficient in this case for this purpose. Therefore, in this case, taking into consideration the fact that the image data of each image unit contains 16 words, the pointers should be equal to the corresponding top address divided by 16.

In the example of FIG. 4, units A and D of the image 1 contain all "0"s, and therefore "0"s are stored in the corresponding memory regions A-1 and D-1 of the map memory 2 (FIG. 5). Units B and C of the image 1 include image information (16 dots×16 dots) and must be stored in the data memory 3 (FIG. 6) at addresses $120_{16}$ (that is, 120 to the base 16, or 120 in hexadecimal form) and $270_{16}$. Addresses $12_{16}$ and $27_{16}$ ($120_{16}$ and $270_{16}$ divided by $10_{16}$, respectively) are therefore stored in the corresponding memory regions of the map memory 2, as shown in FIG. 5.

In the above-described example, the capacity of the map memory 2 is fixed at 254×176 words; however, the capacity of the data memory 3 may be chosen taking into consideration the nature of image information to be processed.

Further, in the above-described system, data representing whether or not the image units each consist of M×N dots can be stored in the map memory. Complementary data representing a wider range (M'×N' units) may be added to that data if desired. Such complementary data may take the following form:

(1) Data indicative of whether or not all the units on a line of the map memory are all "white". This technique increases the overall processing speed.

(2) Data indicative of the number of units on each line of the map memory which are not "white". Employment of this technique can also increase the processing speed. Specifically, when, in reading a line, the number of units read containing image information becomes equal to the number of units of stored data, the reading operation can shift to the next line. In addition, an error check can be made using the number of units thus detected.

Figure 6:
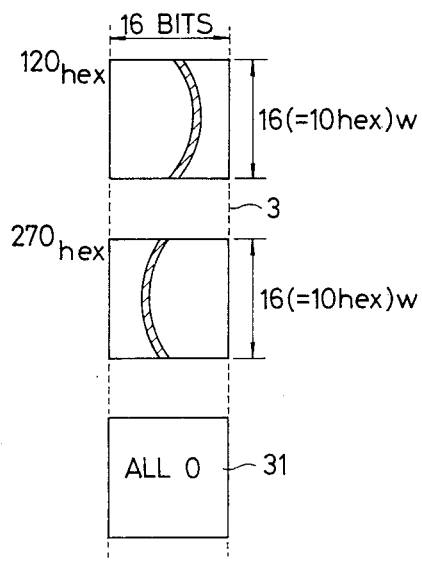

Furthermore, according to the invention, units containing the same image information may share a image data memory unit. This can be implemented as follows: As shown in FIG. 6, an image memory region 31 for an all white icture unit is provided in the data memory 3. When a unit is all "white" (all "0"s), the corresponding pointer stored in the map memory 2 points to the area 31 in the data memory 3. This is advantageous in that all "white" units can be handled completely in the same manner as the other units.

As described above, in accordance with this embodiment of the invention, the various units of the image being scanned are identified with the memory regions of the map memory. Thus, any given position in the image can be linked with a corresponding data memory area of the data memory by means of the pointers stored in a memory region of the map memory.

Furthermore, the memory position for storing the image data of each unit is not particularly limited. Accordingly, units which contain the same image information can share a common data memory area. The above-described sharing of data memory areas can be effected between units of multiple images as well as those of a single image.

In addition, movement of parts of an image can be achieved merely by moving the data in the map memory. Thus, the above-described system is simple in construction, and moreover has a high operating speed compared with a system in which image data is stored directly.

Furthermore, ORing and ANDing of binary image data can be carried out in units. These logical operations can be achieved quickly by utilizing a single (M×N) unit containing all "0"s. This technical concept can be applied not only to a single image but also to multiple images.

In the image data storage system of the invention, after image data for an entire original document sheet, or for N scanning lines on such a document, has been read and stored, it may be detected whether or not image data is already available for each unit so that it can be determined whether or not it is necessary to store the image data in the map memory and data memory. Alternatively, it can be determined whether or not image data is available for each unit for every scanning line. The latter is effective in reducing the needed buffer memory capacity.

A technique of the invention for determining when an image unit is all "white" and a preferred embodiment of an image data conversion apparatus of the invention will now be described. It is assumed that a symbol "NIL" indicates a pointer should be stored in the map memory which points to the all "0"s data memory area 31 in FIG. 6.

Figure 7A:
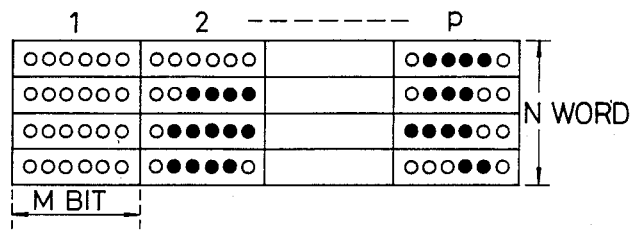
FIGS. 7A-7C, 8A-8E and 9A and 9B are explanatory diagrams showing operational relationships between the map memory and the data memory.
Figure 7B:
Figure 8A:
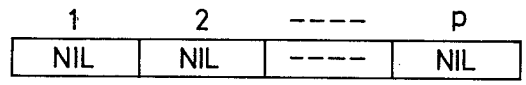
Figure 8B:
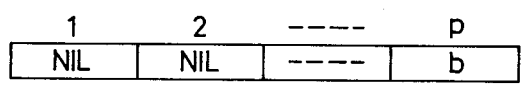
Figure 8C:
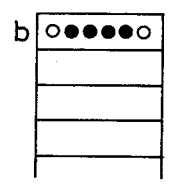
Figure 8D:
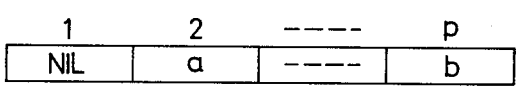

(1) Referring to FIGS. 7A and 7B, in the first line (in the main scanning direction) in FIG. 7A, it is found that the p-th unit includes data other than all "0"s. Therefore, a data memory area for the p-th unit is allocated. Thus, as shown in the FIG. 8B, instead of "NIL", a pointer b to the appropriate data memory is stored in the p-th memory region in the map memory. As shown in FIG. 8C, the data of the p-th unit is stored in the first word of the data memory area thus allocated. The first lines of the first, second,—and (p−1) units remain "NIL", being all "0"s.

Figure 8E:
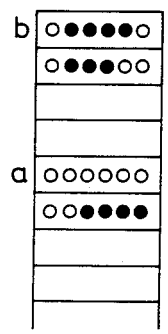

(2) In the second line in FIG. 7A, the second unit includes data other than all "0"s. Therefore, similar to the above-described case (1), a data memory area of N words for the second unit is allocated, and instead of "NIL", a pointer a is inserted in the corresponding memory region of the map memory. As shown in FIG. 8E, "0"s are stored in the first word of the data memory area thus allocated and the data of the second line stored in the second word position. As for the p-th unit, a data memory area has already been designated with the pointer b. Therefore, the data of the second line of the p-th unit is automatically stored in the second word of the second memory area of the data memory which has been identified with the pointer b. In the first unit, both the first and second lines are all "0"s and therefore the corresponding columns remain "NIL".

(3) Continuing on in the same manner, the data of the FIG. 7A is processed line by line up to the N-th line. In the example given, in the first unit, all the N lines are "0"s; that is, the first unit is made up entirely of white image elements. Accordingly, the map memory region for the first unit remains "NIL".

Figure 9A:
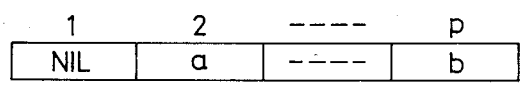
Figure 9B:
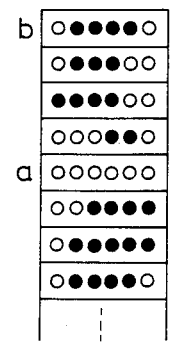

(4) As a result of the process, the assembled map memory and the data memory contents which are produced for the data shown in FIG. 7A are as shown in FIGS. 9A and 9B, respectively.

Figure 7C:
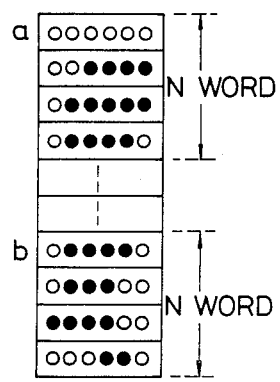

The above-described processing is carried out by referring to the input data word by word (each word being composed of 16 bits in the example of FIGS. 7A–7C). Therefore, the described processing can be implemented using only one or two buffers each having a capacity of one word.

A preferred embodiment of a picture data conversion system of the invention will be described with reference to FIG. 10. More specifically, the system will be described with reference to the case where one unit is made up of M×N bits as shown in FIG. 1 and M=16 and N=16, that is, one word is composed of 16 bits, and one unit is made up of 16 words.

In this embodiment, it is assumed that signals are processed in hexadecimal form. If, in this case, a value which is obtained by dividing a data memory address by 16 ($10_{16}$) is used as a pointer, then the amount of data memory address space which can be addressed with each can be increased. For instance, when in a case where addressing is performed using 16 bits and the value which is obtained by dividing the data memory address by 16 is not used as the pointer, the data memory address space which can be accessed with the 16 bits extends only from 0 to FFFF, as shown in FIG. 11A. On the other hand, when values as described above are used as the pointer, the data memory address space which can be addressed is increased to 0 to FFFFF, as shown in FIG. 11B. Thus, the invention will be described with reference to pointer values which are obtained by dividing the data memory address by 16.

Figure 10:
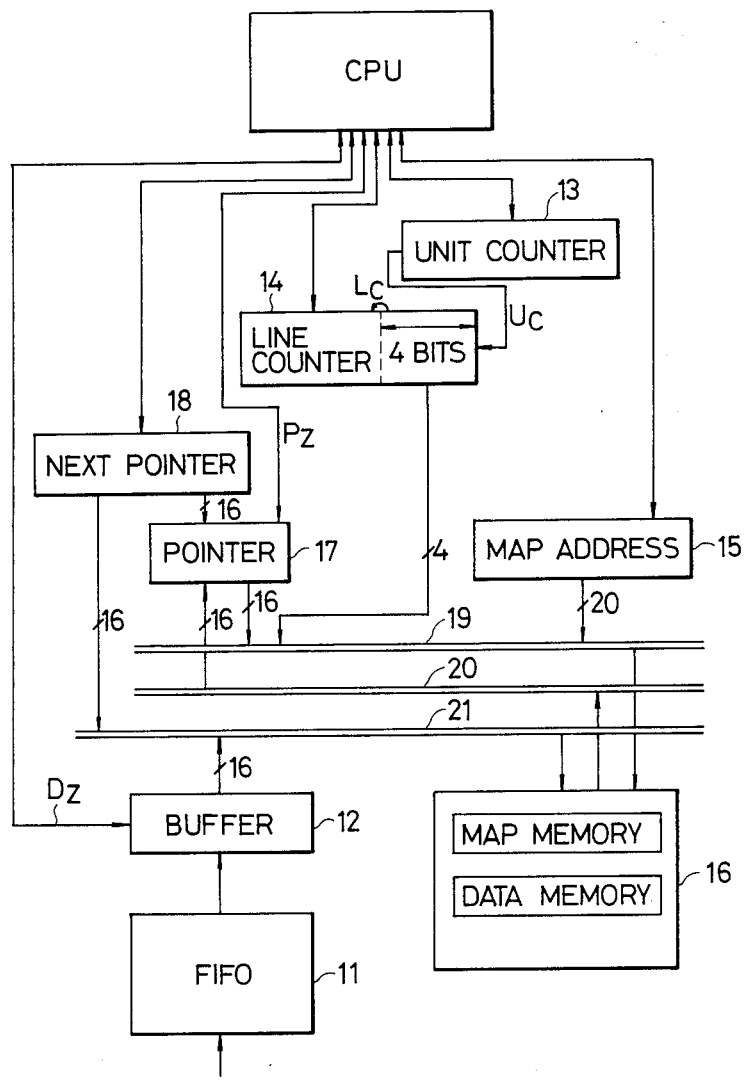
FIG. 10 is a block diagram of a preferred embodiment of an image data conversion system according to the invention.

In FIG. 10, reference numeral 11 designates a FIFO (First In First Out) memory device to which data read by an input scanner is applied in words of 16 bits. Reference numeral 12 indicates a buffer which, in response to a command from a CPU, temporarily stores each data word read out from the FIFO. Reference numeral 13 indicates a binary counter, the count value of which is increased by one each time one word is inputted to the buffer 12 from the FIFO 1.

It is detected whether or not the data received in the buffer 12 is all "0"s, and the result of this detection is applied, as a signal $D_Z$, to the CPU. A number equal to the complement of the number of words in the main scanning direction of the image is inputted to the unit counter 13 in advance. When the count value of the unit counter reaches zero by adding one thereto whenever one word is inputted to the buffer 2 as described above, the unit counter provides a carry $U_C$ to indicate the end of a line.

Further in FIG. 10, reference numeral 14 designates a line counter in which zero is set as the initial value. The counter 14 is incremented by one whenever the carry $U_C$ is generated as described above. The line counter produces a carry $L_C$ whenever a carry from its four lower-order bits occurs. Reference numeral 15 designates a map address register, and 16 a main memory including both a map memory region and a data memory area. The map address register 15 temporarily stores the addresses for the map memory for units which include data read out from the FIFO 11.

More specifically, first the top address of the map memory is inputted to the map address register 15. The content of the unit counter 13 is then increased by one each time one word is read out of the FIFO 11 and is reset to the initial value upon the generation of the carry $U_C$. Therefore, each unit of the map memory is scanned 16 times. When the carry $L_C$ is produced, the top address for the next 16 lines is inputted.

Reference numeral 17 designates a pointer register. The content of the map memory which has been addressed by the map address register 15 is stored in the pointer register. If the content thus stored is all "0"s, a signal $P_Z$ indicating this fact is raised to a logical "1" level. The pointer inputted to the pointer register 17 is the value which is obtained by dividing the memory address by 16 ($10_{16}$) as described above. Therefore, if the content of the map memory is not all "0"s, as determined by the four lower-order output bits from the line counter, the data memory in the main memory 16 is addessed.

Further in FIG. 10, reference numeral 18 designates a next pointer register. When the pointer inputted to the pointer register 17 is "0" and the data inputted to the buffer 12 includes data other than all "0"s, the content of the register 18 is transferred to the pointer register 17. One is added to the next pointer register 18 after the next pointer is transferred to the pointer register 17.

Still further in FIG. 10, reference numerals 19, 20 and 21 designate a memory address bus, a memory read bus, and a memory write bus, respectively.

Figure 12A:
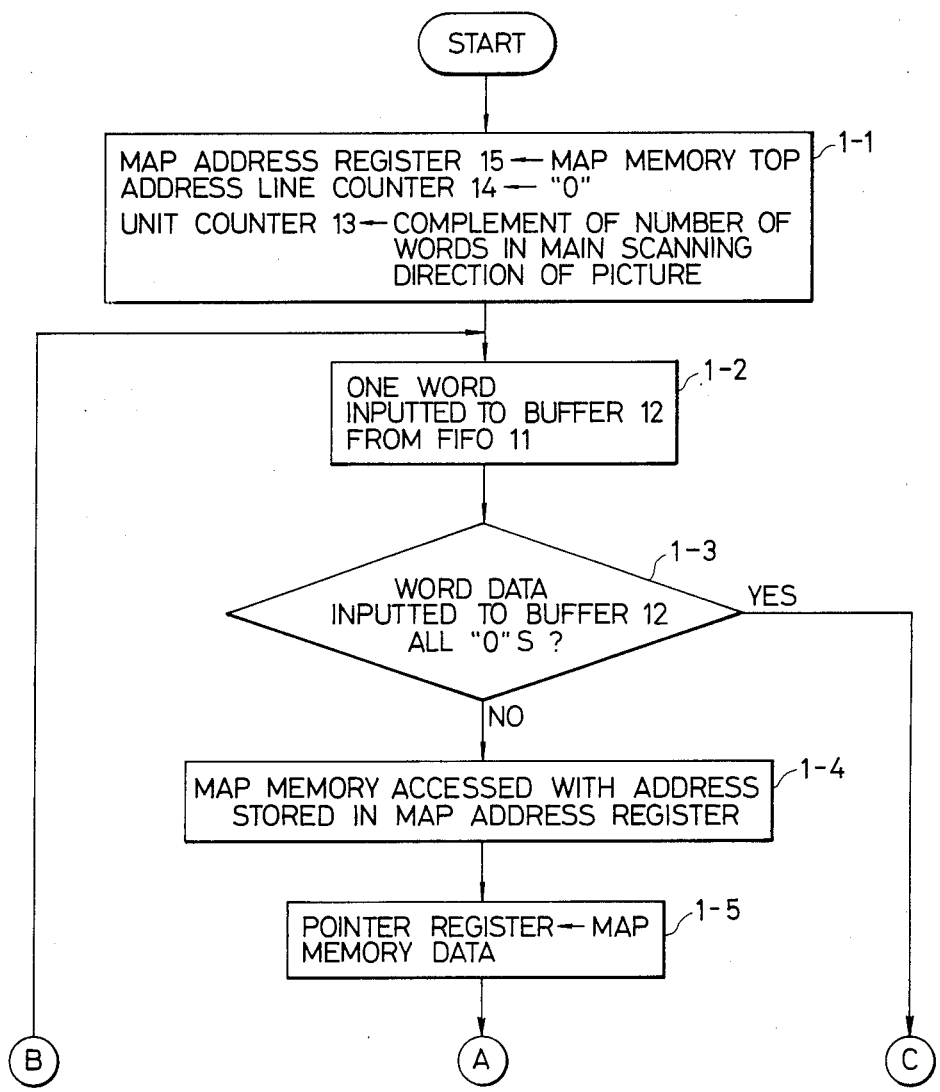
FIGS. 12A-12C, taken together, are a flowchart for a description of the operation of the system of FIGS. 11A and 11B.
Figure 12B:
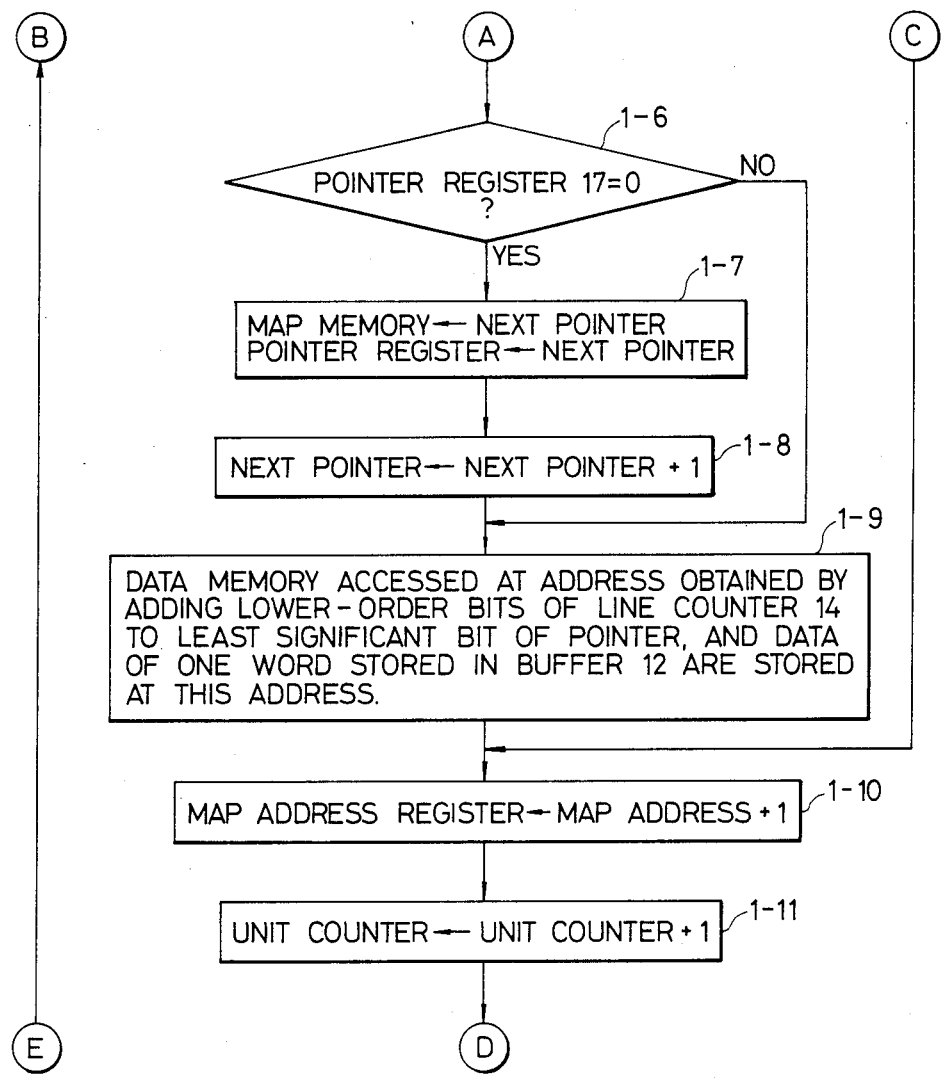
Figure 12C:
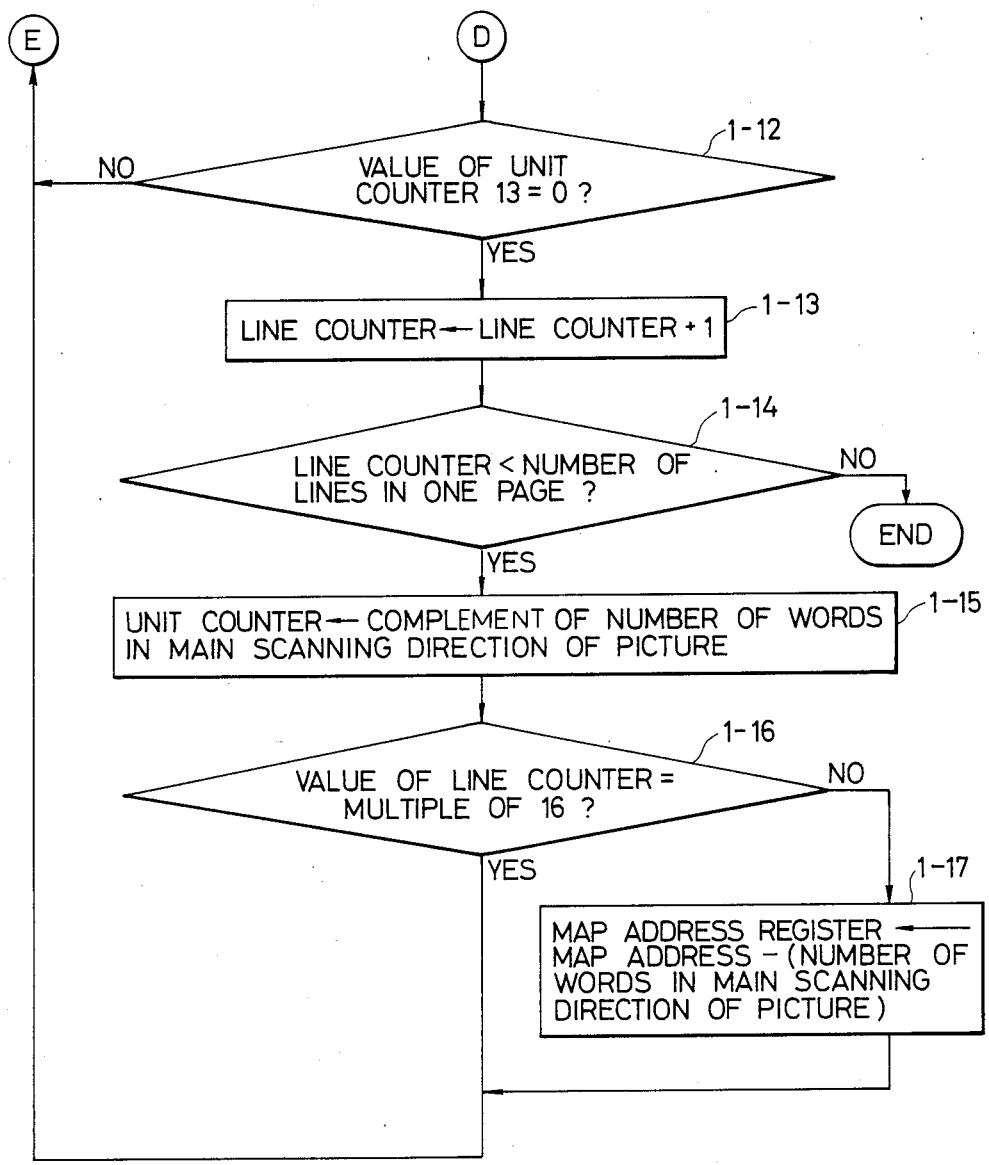

The operation of the system thus constructed will be described with reference to the flowcharts of FIGS. 12A to 12C, which are parts of a composite flowchart.

Step 1-1. A map memory top address is placed in the map address register 15. The line counter 14 is reset to zero. A number equal to the complement of the number of words in the main scanning direction of the picture is set in the unit counter 13.

Step 1-2. The data of one word is inputted into the buffer 12 from the FIFO 11.

Step 1-3. It is determined whether or not the data of the word stored in the buffer 12 is all "0"s. If not, step 1-4 is effected. If the data is all "0"s, step 1-10 is carried out.

Step 1-4. The map memory is accessed through the memory read bus 19 from the map address register 15.

Step 1-5. The map memory data, that is, the pointer value, is read out and inputted through the memory read bus 20 to the pointer register 17. The value which is obtained by dividing the data memory address by 16 is stored as the pointer in the map memory as described with reference to FIG. 11B.

Step 1-6. It is determined whether or not the pointer stored in the pointer register 17 is "0". If "yes", step 1-7 is carried out. If "no", step 1-9 is performed.

Step 1-7. The data of the next pointer register 18 is stored in the map memory through the memory write bus 21. The data of the next pointer register 18 is transferred to the pointer register 17. The initial value of the next pointer register 18 is set to a predetermined value.

Step 1-8. One is added to the content of the next pointer register 18.

Step 1-9. The data memory in the main memory 16 is accessed through the memory address bus 19 at an address which is obtained by inserting the four lower-order bits of the line counter 14 below the least significant bit of the pointer stored in the pointer register 17. Next, one word of data inputted to the buffer 12 is transferred through the memory write bus 21 to the data memory and stored at the accessed address.

Step 1-10. One is added to the data in the map address register 15.

Step 1-11. One is added to the content of the unit counter.

Step 1-12. It is detected whether or not the counter value of the unit counter is "0". If "yes", step 1-13 is carried out. If "no", step 1-2 is carried out again.

Step 1-13. One is added to the content of the line counter 14.

Step 1-14. It is detected whether or not the count value of the line counter is smaller than the number of lines in one page. If "yes", then step 1-15 is carried out. If "no", the operation is ended.

Step 1-15. A number equal to the complement of the number of words in the main scanning direction of the image is set in the unit counter 13.

Step 1-16. It is determined whether or not the count value of the line counter 14 is a multiple of 16. If "yes", step 1-2 is carried out again. If "no", step 1-17 is executed.

Step 1-17. The value which is obtained by subtracting the number of words in the main scanning direction from the map address is set in the map address register 15. Through steps 1-16 and 1-17, the same part of the map memory is scanned 16 times.

As is apparent from the above description, according to the invention, by providing only one or two buffers 12 having a capacity of one word, conversion of input image data can be achieved such that either "0" or an actual pointer is stored in the map memory, and, for the latter case, image data of a unit including data other than all "0"s is stored in a area of the data memory which corresponds to the pointer. Accordingly, the buffer employed in the system of the invention can be much smaller in capacity than that in the conventional system.

The system of the invention has been described with reference to the case where the input data is stored in a FIFO. However, the FIFO may be omitted if the speed of inputting the data into the buffer 12 is matched with the processing speed of the system. Furthermore, if the data applied to the buffer 12 includes a line end indicating signal, it is possible to eliminate the unit counter 13 which is used for detecting the end of each line. In this case, the line ending signal is separated from the input data and applied to the line counter 14.

In the above-described system, adding the four lower-order bits of the line counter 14 to the least significant bit of the pointer in step 1-9 is achieved with a hardware arrangement; however, it may be carried out in software if desired. In addition, the map address register 15 may be controlled by software instead of the unit counter 13 and the line counter 14.

While this embodiment of the invention has been described with reference to a case where each unit (image data region) contains 16×16 bits, it should be noted that the invention is not limited thereto or thereby.

A further example of an image data conversion apparatus according to the invention will now be described. The apparatus will be described with reference to the case where the image data in which a word is 16 bits and a line of 256 words is compressed with 16 bits×16 words as one unit, that is, M=N=16 and p=256 in FIG. 1.

Figure 13:
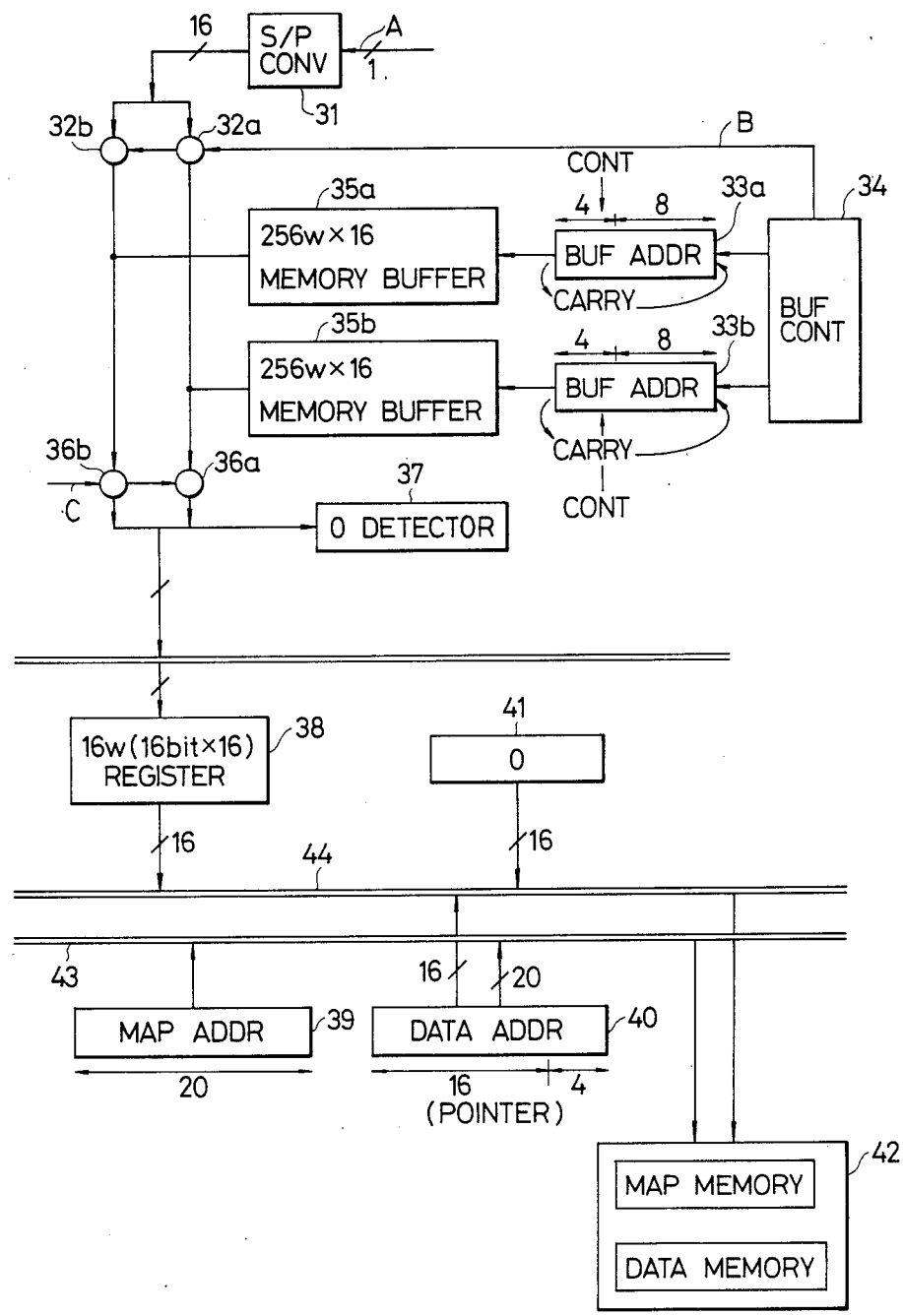
FIG. 13 is a block diagram showing another embodiment of an image data conversion apparatus according to the invention.

In FIG. 13, reference numeral 31 designates an S/P (Serial/Parallel) converter for converting an input signal A (RIS video signal) which is inputted in a serial mode, into a parallel signal; 32a and 32b, input line selecting circuits which are alternately made active and inactive; and 33a and 33b, first and second buffer address registers, respectively. Each of the buffer address registers 33a and 33b in this embodiment is assumed to be 12 bits long, consisting of eight lower-order bits and four higher-order bits. In the registers 33a and 33b, whenever the end of a line is reached, the eight lower-order bits ($2^8=256$) are cleared and one is carried (added to) to the four higher-order bits. Thus, whenever one complete line (256 words) has been read, the eight lower-order bits are cleared (set to zero), and at the end of 16 lines, the four higher-order bits are cleared. A buffer control circuit 34 outputs an input line selecting signal B used to select one of the input line selecting circuits 32a and 32b, and applies one pulse of the signal B to the buffer address register 33a or 33b whenever one word is written in a memory buffer.

First and second memory buffers 35a and 35b, having a capacity of 256 words × 16 lines, receive input signals of 16 bits per word through the input line selecting circuits 32b and 32a. In other words, each of the first and second memory buffers 35a and 35b can store 256 data units at a time.

Further in FIG. 13, reference numerals 36a and 36b designate output line selecting circuits, one of which is selected by a line selecting signal C from a CPU (not shown); and 37, a "0" detector for detecting whether or not the data of 16 bits passed through the output line selecting circuit is all "0"s. A register 38 temporarily stores the data of 16 words (one unit) read out from either of the memory buffers 35a and 35b.

Also in FIG. 13, reference numeral 39 designates a map address register; 40, a data address register; 41, a 16-bit "0" data generator; and 42, a main memory including a map memory region and a data memory area. The map address register 39 is 20 bits long, and is connected to a memory address bus 43. The data address register 40 is also 20 bits long, consisting of four lower-order bits and 16 higher-order bits, the latter being applied to a memory write bus 44. The 20 bits consisting of the four lower-order bits and the 16 higher-order bits are applied to a memory address bus 43.

Figures 1, 14:
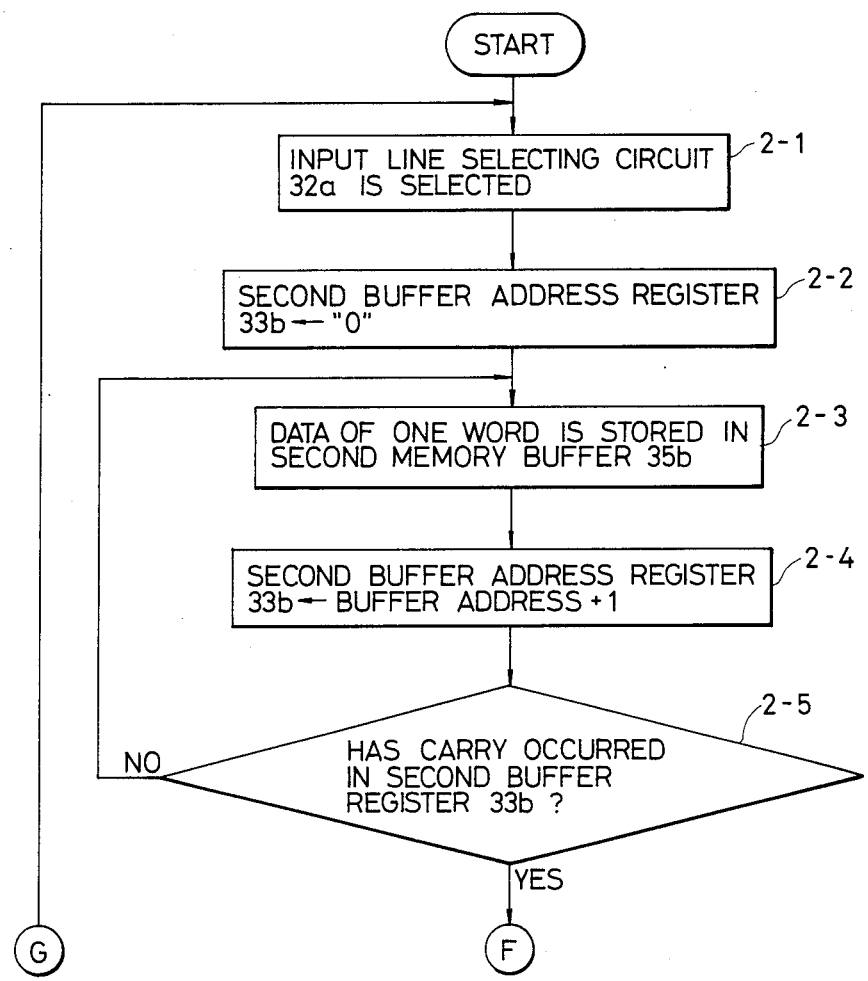
FIGS. 14, 15A and 15B are flowcharts for a description of the operation of the apparatus in FIG. 13.
Figures 2, 14:
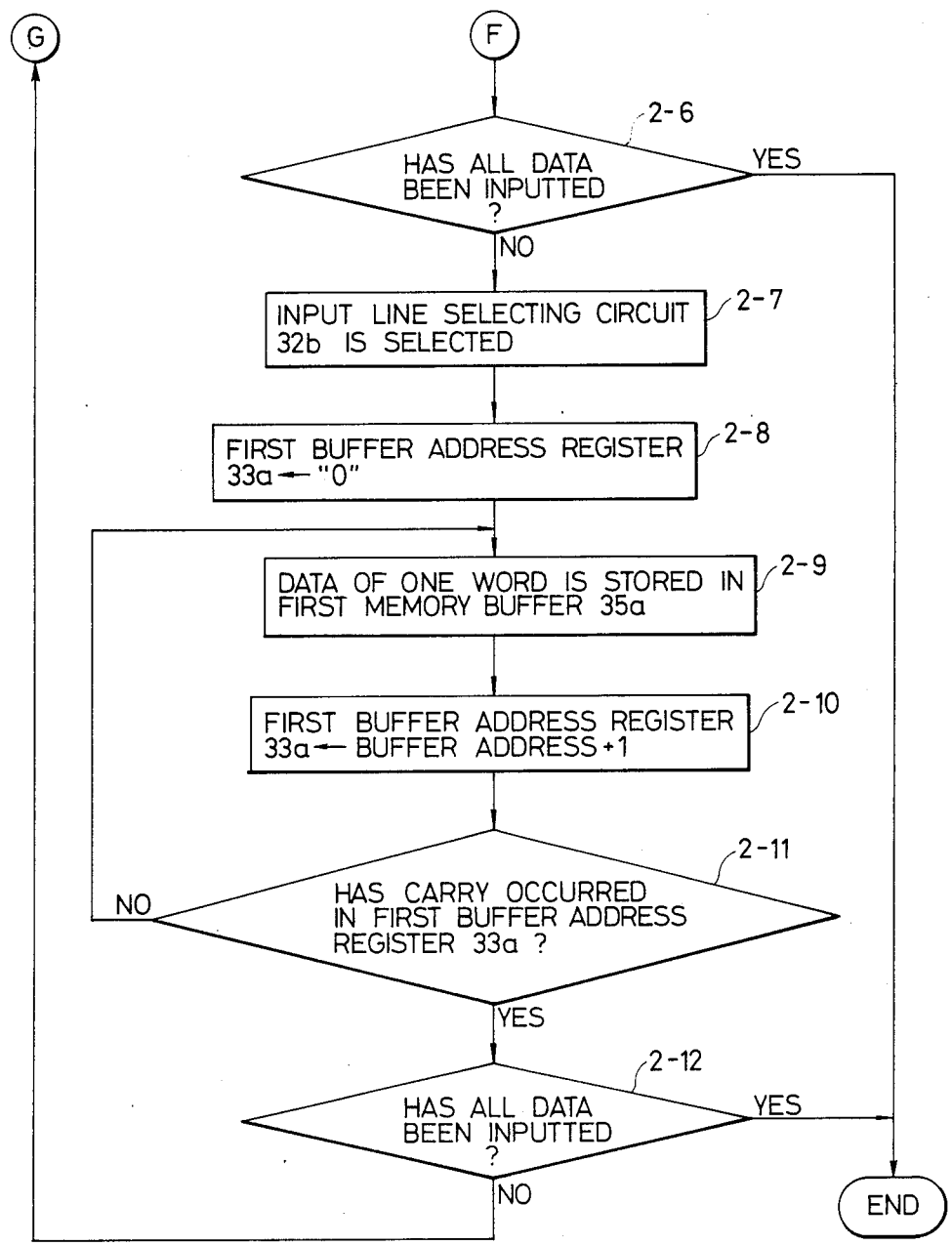

The operation of the system thus constructed will now be described. First, an operation in which an input signal which has been converted into a 16-bit parallel signal by the S/P converter 31 is stored in one of the memory buffers 35a and 35b will be described with reference to the flowchart of FIG. 14. In this connection, it should be noted that, in the first and second memory buffers 35a and 35b, addresses in the main scanning direction are specified by the eight lower-order bits of the first and second buffer address registers 33a and 33b, and addresses in the auxiliary scanning direction with the four higher-order bits.

Step 2-1. The input line selecting circuit 32a, for instance, is selected by the input line selecting signal B.

Step 2-2. The second buffer register 33b is cleared.

Step 2-3. The S/P converter provides the data of one word, which is stored in the second memory buffer 35b in correspondence with the address specified in step 2-2.

Step 2-4. One is added to the content of the second buffer address register 33b.

Step 2-5. It is determined whether or not a carry has occurred from the second buffer address register 33b. If "no", step 2-3 is effected again. Steps 2-3 and 2-4 are repeatedly carried out until the occurrence of a carry from the second buffer address register 33b is detected, whereupon the data of 256 words × 16 bits is stored in the second memory buffer 35b. If "yes" in step 2-5, step 2-6 is effected.

Step 2-6. It is detected whether or not all the image data has been inputted. If "yes", the operation is ended. If "no", the next step 2-7 is carried out.

Step 2-7. The input line selecting circuit 32b is selected by the input line selecting signal.

Step 2-8. The first buffer address register 33a is cleared to zero.

Steps 2-9, 2-10 and 2-11. The steps are similar to steps 2-3, 2-4 and 2-5 described above. If a carry occurs in the first buffer address register 33a in step 2-11, that is, if "yes" is found in step 2-11, the data of 256 × 16 words is stored in the first memory buffer 35a.

Step 2-12. It is detected whether or not all the image data has been inputted. If "yes", the operation is ended. If "no", step 2-1 is effected again to repeat the above-described operation. The data stored in the second memory buffer 35b is read out while input data is being written into the memory buffer 35a, while on the other hand, the data stored in the first memory buffer 35a is read out while input data is being written in the second memory buffer 35b.

Figures 1, 15A:
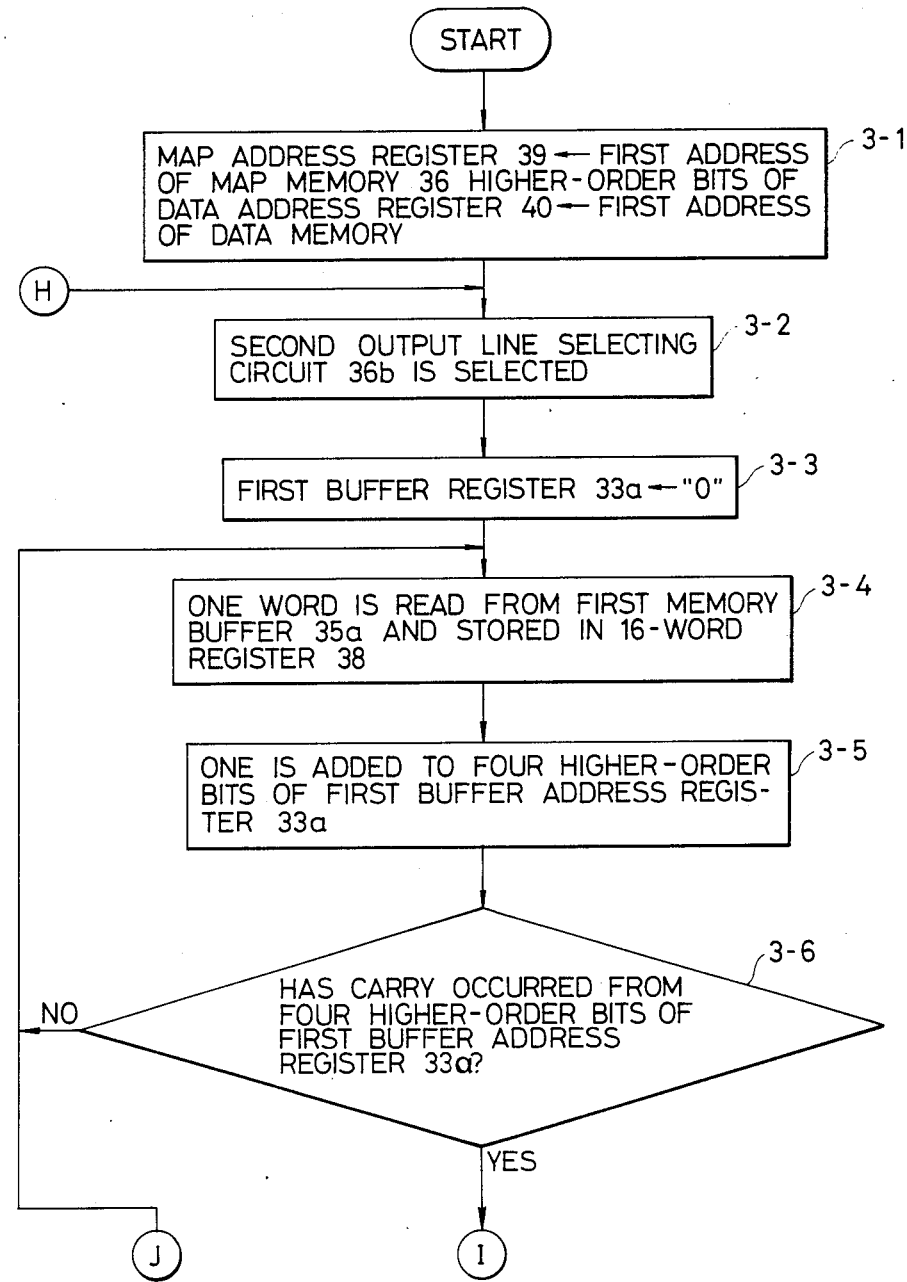
Figures 2, 15A:
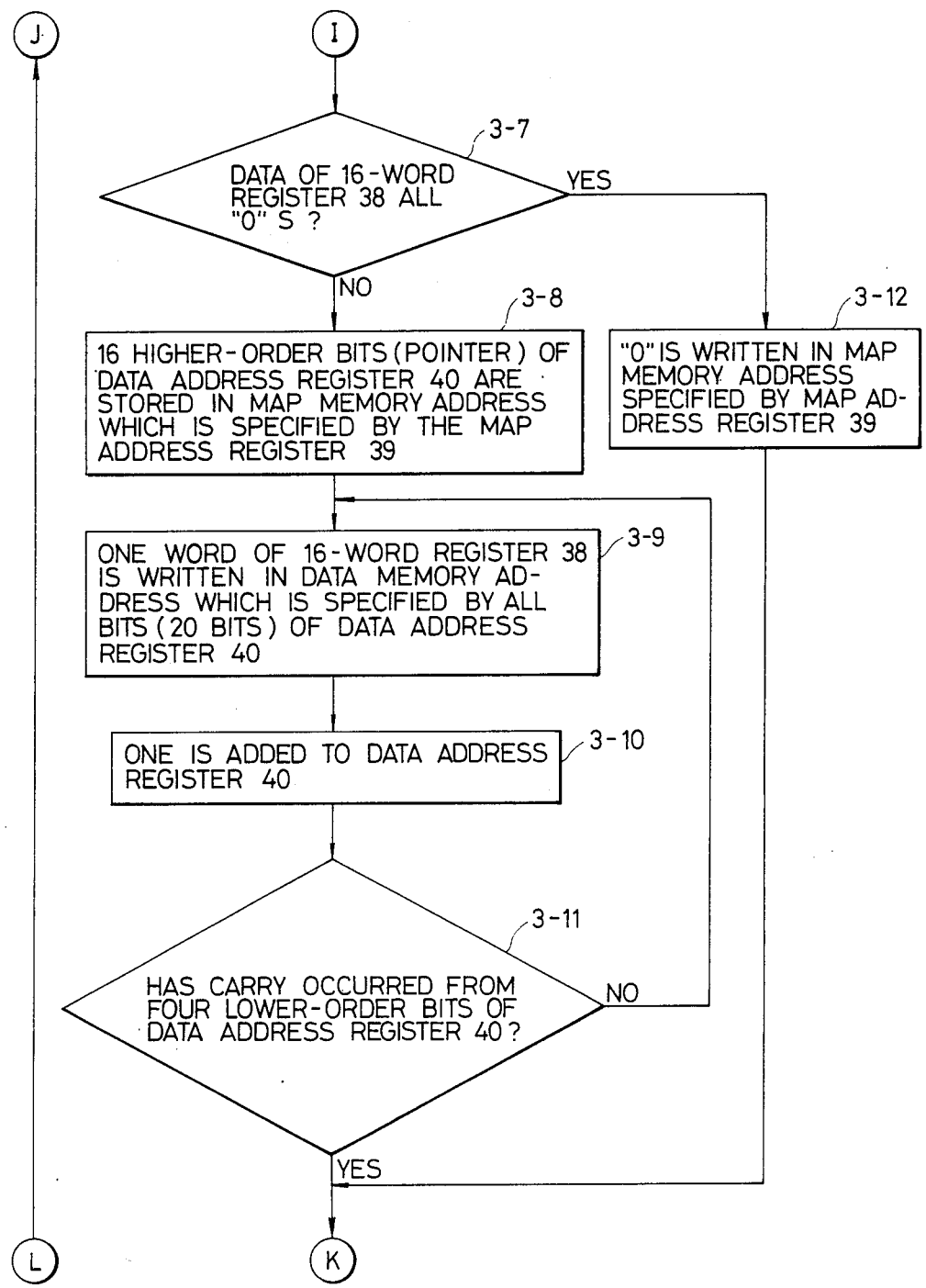
Figures 2, 15B:
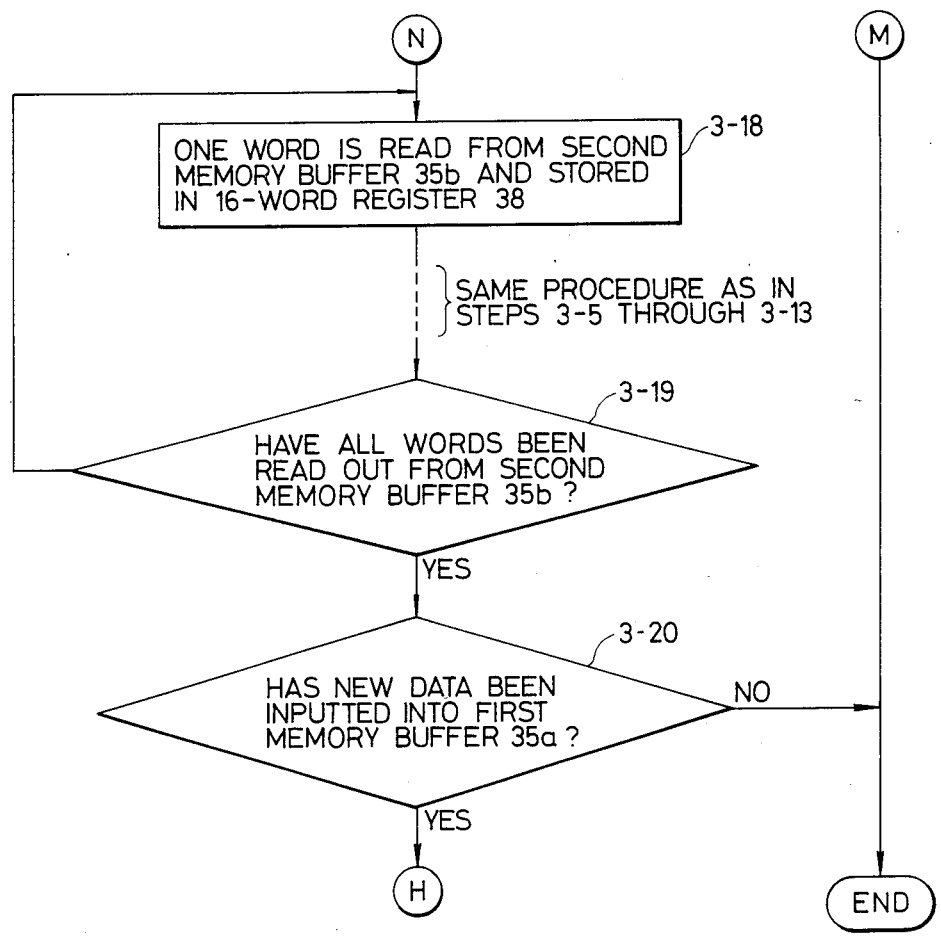

A preferred procedure for reading data out of the first and second memories 35a and 35b will be described with reference to the flowchart of FIGS. 15A and 15B.

Step 3-1. The first address of the map memory in the main memory 42 is set in the map address register 39, and the first address of the data memory is set in the data address register 40. In this case, the first address of the data memory should be one whose four lower-order bits are "0".

Step 3-2. The output line selecting circuit 36b is selected by the read line selecting signal C.

Step 3-3. The first buffer address register 33a is cleared to zero.

Step 3-4. One word is read out of the first memory buffer 35a and is stored in the 16-word register 38.

Step 3-5. One is added to the four higher-order bits of the first buffer address register 33a.

Step 3-6. It is detected whether or not a carry has occurred from the four higher-order bits of the first buffer address register 33. If "no", step 3-4 is effected again. If "yes", the next step 3-7 is performed. It can be readily understood that, when "yes" occurs in step 3-6, the data of one unit will have been transferred from the first memory buffer 35a to the 16-word register 38.

Step 3-7. It is detected by the "0" detector 37 whether or not the data inputted to the 16-word register 38 is all "0"s. If "no", step 3-8 is carried out, and if "yes", step 3-12 is carried out.

Step 3-8. A pointer, which is the 16 higher-order bits of the data address register 40, is written at the address of the map memory in the main memory 42 which has been specified by the content of the map address register 39.

Step 3-9. One word of the 16-word register 38 is written at the address of the data memory specified by all the bits (20 bits) of the data address register 40.

Step 3-10. One is added to the content of the data address register 40.

Step 3-11. It is detected whether a carry has occurred from the four lower-order bits of the data address register 40. If "no", steps 3-9 and 3-10 are repeatedly carried out until the occurrence of the carry is detected, that is, until an answer of "yes" is obtained. At that time, all of the data stored in the 16-word register 38 will have been transferred to the data memory.

Step 3-12. If it is determined in step 3-7 that the data stored in the 16-word register 38 is all "0"s, "0"s generated by the "0" data generator are stored in the address of the map memory specified by the map address register 39.

Step 3-13. One is added to the content of the map address register 39.

Step 3-14. It is detected whether or not all words have been read out of the first memory buffer 35a. If "no", step 3-4 is effected again, and steps 3-4 through 3-13 are repeated. If "yes", the next step 3-15 is carried out.

Step 3-15. It is detected whether or not new data has been inputted into the second memory buffer 35b. If "no", the operation is ended. If "yes", step 3-16 is conducted.

Step 3-16. The output line selecting circuit 36a is selected.

Step 3-17. The second buffer register 33b is cleared to zero.

Step 3-18. One word is read out of the second memory buffer 35b and stored in the 16-word register 38.

The same procedures as those in steps 3-5 through 3-13 are repeated.

Step 3-19. It is detected whether or not all words have been read out of the second memory buffer 35b. If "no", step 3-18 is effected again, and if "yes" the next step 3-20 is carried out.

Step 3-20. It is detected whether or not new data has been inputted into the first memory buffer 35a. If "yes", step 3-2 is effected again, and if "no", the operation is ended.

As is apparent from the above description, according to the invention, when the data of each unit of an image (as shown in FIG. 1) is all "0"s, "0"s are inputted to the respective region in the map memory, and when the data of each unit is other than all "0"s, an actual pointer is inputted thereto. Only when the unit includes data other than "0"s can all the data of the unit be stored in the data memory area which corresponds to the pointer.

In the above-described embodiment of an image data conversion apparatus of the invention, two memory buffers of 256×16 words are provided, and writing and reading thereinto and therefrom are carried out alternately. Therefore, compression of area data can be achieved at a high speed.

Another embodiment of an apparatus of the invention in which data is not only compressed but also restored will be described with reference to FIG. 16.

Figure 16:
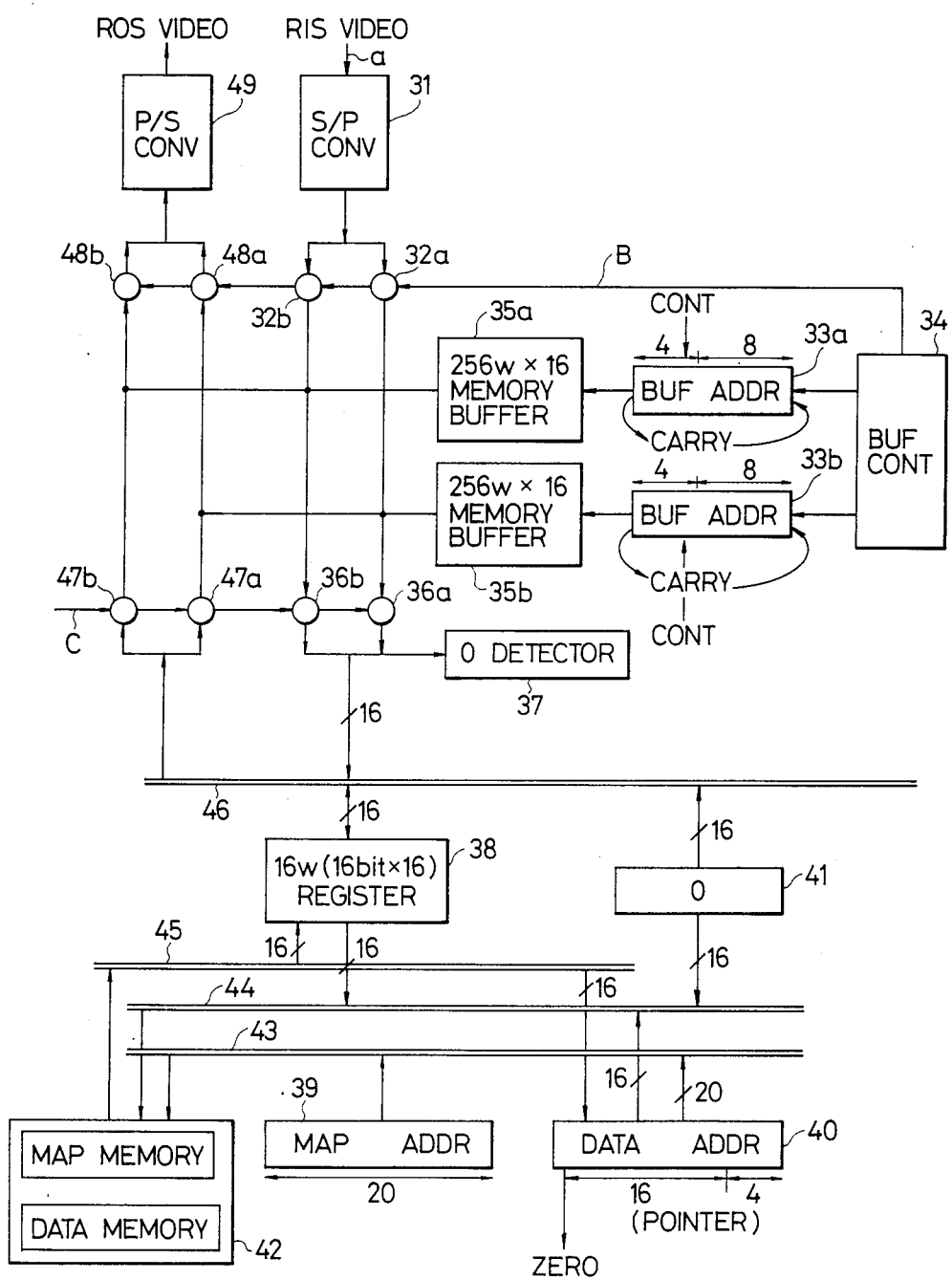
FIG. 16 is a block diagram showing a further embodiment of an apparatus according to the invention.

In FIG. 16, reference numeral 45 designates a memory read bus; 46, a data bus; 47a and 47b, first and second load line selecting circuits which are opened and closed by control signals C from a CPU; 48a and 48b, first and second output line selecting circuits; and 49, a P/S (parallel/serial) converter. The other components are the same as in FIG. 13. The data compressing process of this embodiment will not be described here because it is the same as that of the embodiment of FIG. 13.

Figures 1, 17A:
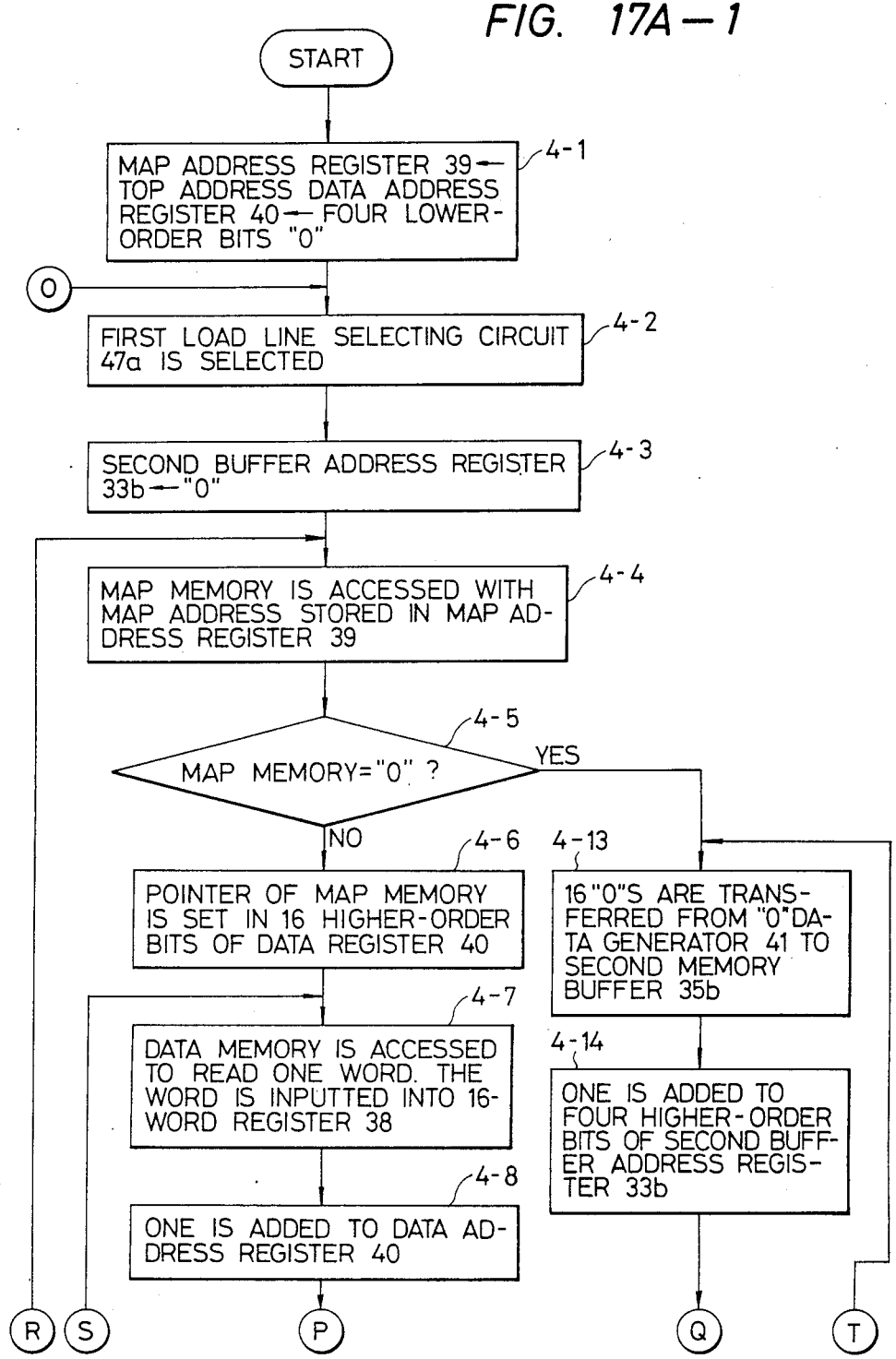
FIGS. 17A, 17B and 18 are flowcharts for a description of the operation of the apparatus of FIG. 16.
Figures 2, 17A:
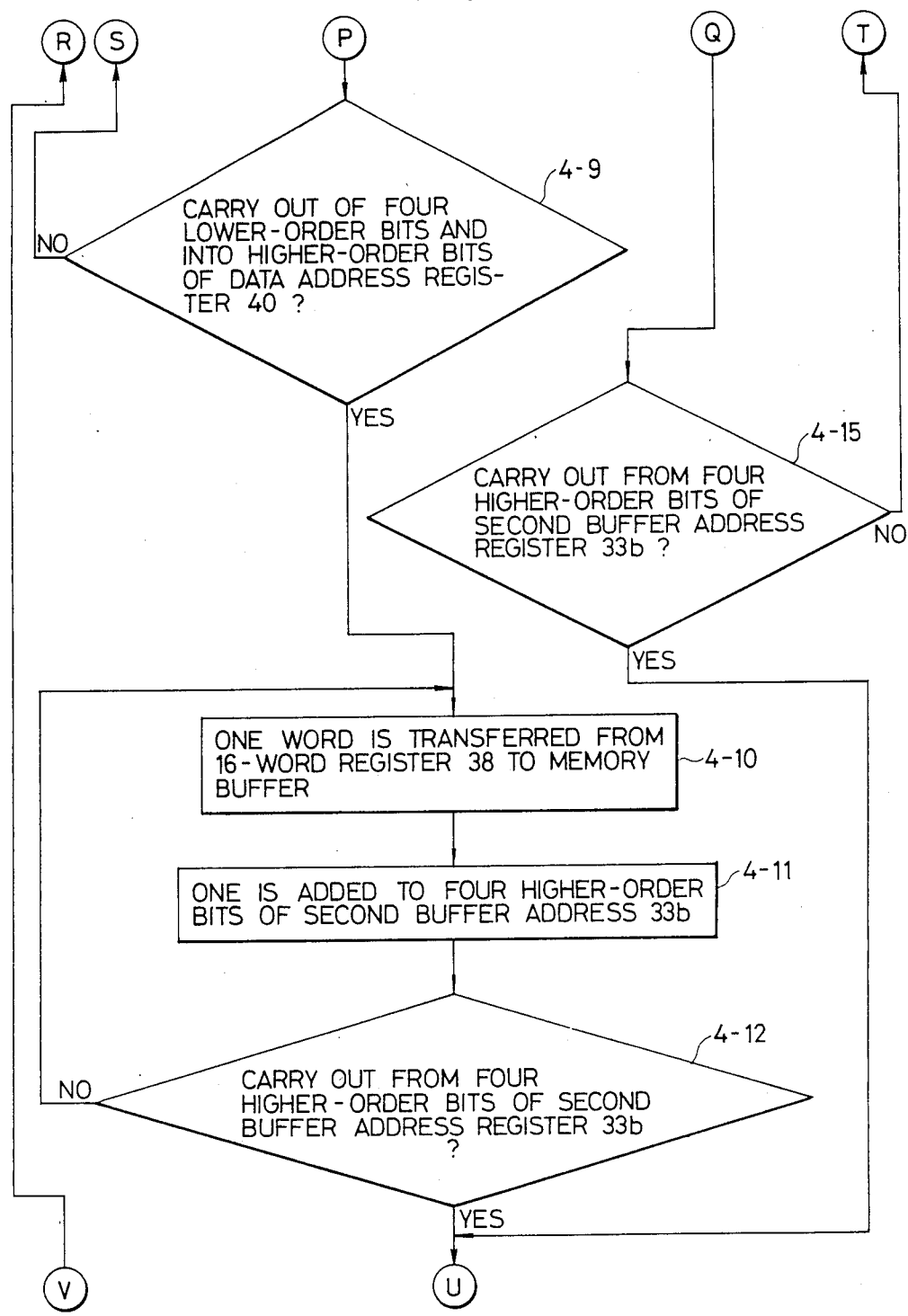
Figures 2, 17B:
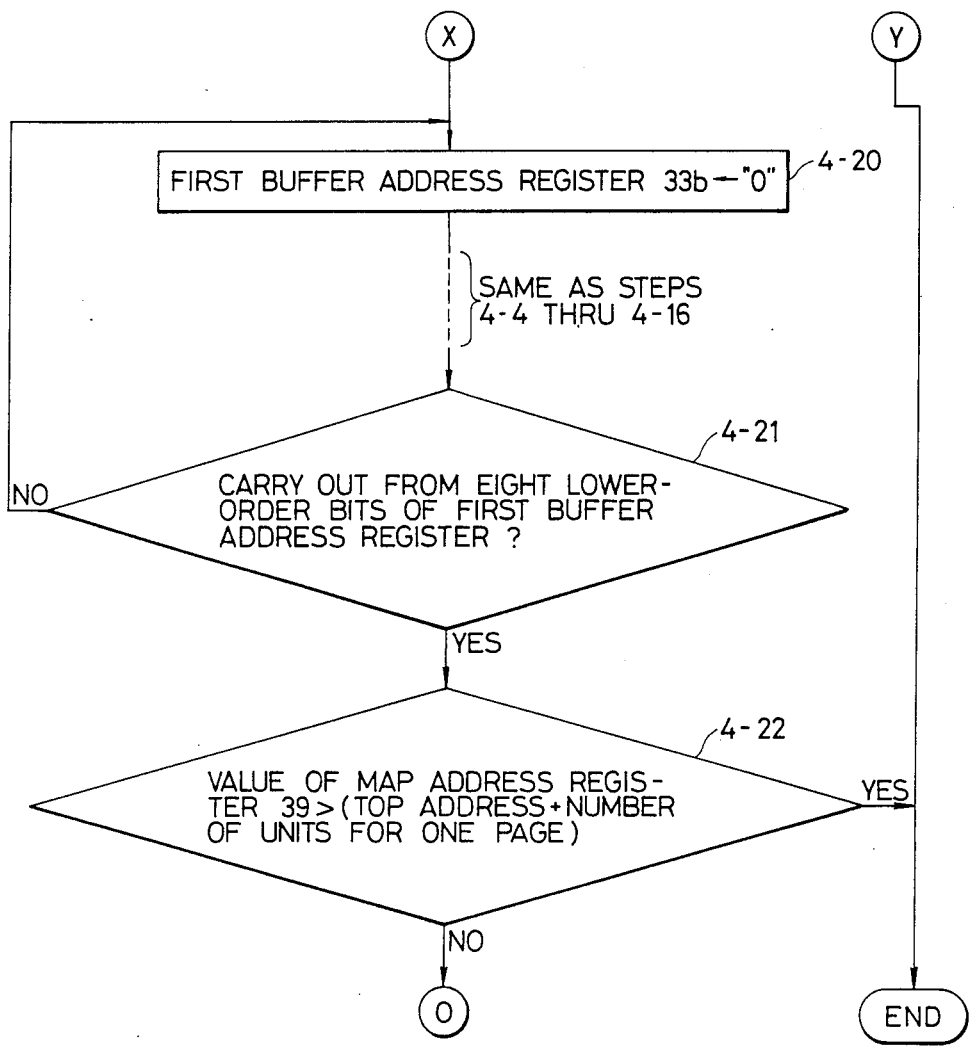
Figures 1, 17B:
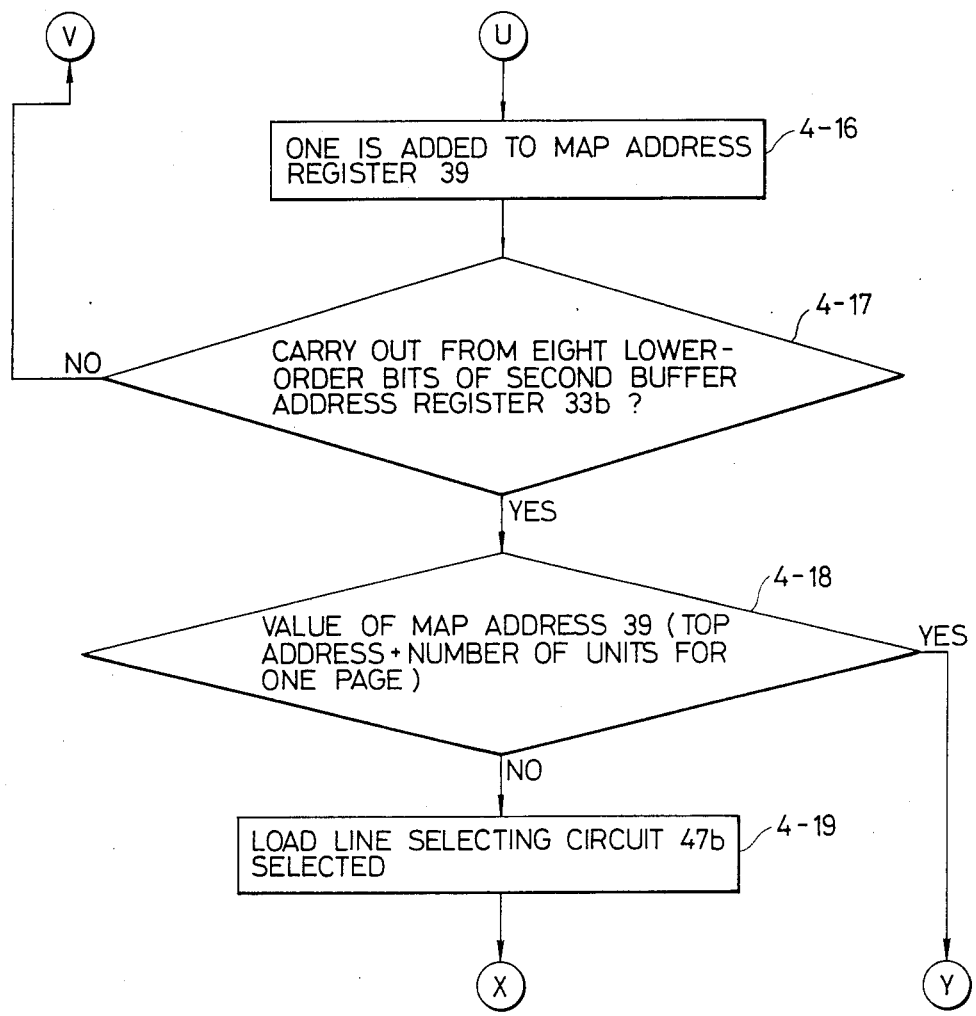

The operation of restoring data which has been compressed will be described with reference to the flowchart of FIGS. 17A and 17B. The term "restoration" or "restoring" is intended to mean formation of original data as shown in FIG. 1 from compressed data stored in the map memory and the data memory as shown in FIGS. 2 and 3.

First, an operation will be described in which the "0" data generator 41 and the corresponding data memory area in the main memory 42 are accessed with the pointer and data "0" (NIL), which are stored in the map memory in the main memory 42, and data read out of the "0" data generator 41 and the data memory is stored in the first or second memory buffer 35a or 35b.

Step 4-1. The top address of the map memory is inputted to the map address register 39 and "0"s are set in the four lower-order bits of the data address register 20.

Step 4-2. One of the first and second load line selecting circuits 47a and 47b, for instance, the cicuit 47a, is selected by the control signal C from the CPU (not shown).

Step 4-3. The second buffer address register 33b is cleared to zero.

Step 4-4. The map memory in the main memory 42 is accessed, through the memory address bus 43, with a map address in the map address register 39.

Step 4-5. It is detected whether or not the data of the map memory is all "0"s. If "no", the next step 4-6 is effected. If "yes", step 4-13 is carried out.

Step 4-6. The data of the map memory, that is, the pointer, is set in the 16 higher-order bits of the data address register 40.

Step 4-7. The data memory is accessed to read one word therefrom, and the word thus read is inputted to the 16-word register 38.

Step 4-8. One is added to the content of the data address register 40.

Step 4-9. It is detected whether or not a carry from the four lower-order bits into the higher-order bits of the data address register 40 has occurred. If "no", step 4-7 is effected again, and steps 4-7 and 4-8 are repeatedly carried out until the carry occurs. Thus, the data of 16 words which correspond to the pointer stored in the data memory are stored in the 16-word register 38.

Step 4-10. One word of data is transferred from the 16-word register 38 through the first load line selecting circuit 47a to the second memory buffer 35b.

Steps 4-11. One is added to four higher-order bits of the second buffer address register 33b.

Steps 4-12. It is detected whether or not a carry has occurred from the four higher-order bits of the second buffer address register 33b. If "no", step 4-10 is effected again. Steps 4-10 and 4-11 are repeatedly carried out until the occurrence of the carry is detected. As a result, the data of one unit stored in the 16-word register 38 is stored, in the form of one word in the main scanning direction and 16 lines in the auxiliary scanning direction in the second memory buffer 35b.

Step 4-13. When the data of the map memory is all "0"s in step 4-5, the "0" data generator 41 transfers 16 "0"s to the second memory buffer 35b.

Step 4-14. One is added to the four higher-order bits of the second buffer address register 33b.

Step 4-15. It is detected whether or not a carry has occurred from the four higher-order bits of the second buffer address register 33b. If "no", step 4-13 is effected again, and steps 4-13 and 4-14 are repeatedly carried out until the occurrence of the carry is detected. As a result, all "0"s are stored in the form of one word in the main scanning direction and 16 lines in the auxiliary scanning direction in the second memory buffer 35b.

Step 4-16. One is added to the content of the map address register 39.

Step 4-17. It is detected whether or not a carry has occurred from the eight lower-order bits of the second buffer address register 33b. If "no", step 4-4 is effected again, and steps 4-4 through 4-17 are repeatedly carried out until the carry is detected. As a result, data is stored in the second memory buffer 35b in the format of 256 words in the main scanning direction and 16 lines in the auxiliary scanning direction. If "yes", in step 4-17, the next step 4-18 is performed.

Step 4-18. It is determined whether or not the content of the map address register 39 is larger than a value which is obtained by adding the number of units in one page to the top address set in step 4-1. If "yes", the operation is ended because the image data of one page will then have been read out. If "no", the next step 4-19 is effected.

Step 4-19. The load line selecting circuit 47b is selected by the control signal C from the CPU so that the first memory buffer 35a is selected.

Step 4-20. The first buffer address register 33a is cleared to zero. The same procedures as those of steps 4-4 through 4-16 are carried out.

Steps 4-21. It is detected whether or not a carry has occurred from the eight lower-order bits of the first buffer address register 33a. If "no", step 4-20 is effected. If "yes", the data is stored, in the format of 256 words in the main scanning direction and 16 lines in the auxiliary scanning direction, in the first memory buffer 35a.

Step 4-22. As in step 4-18, it is determined whether or not the content of the map address register 39 is larger than the value which is obtained by adding the number of units in one page to the top address. If "no", step 4-2 is carried out and the above-described operations are performed again. If "yes", the procedure is ended.

Thus, the compressed image data stored in the map memory and the data memory are stored in original form (before compression) in the first and second memory buffers.

Figure 18:
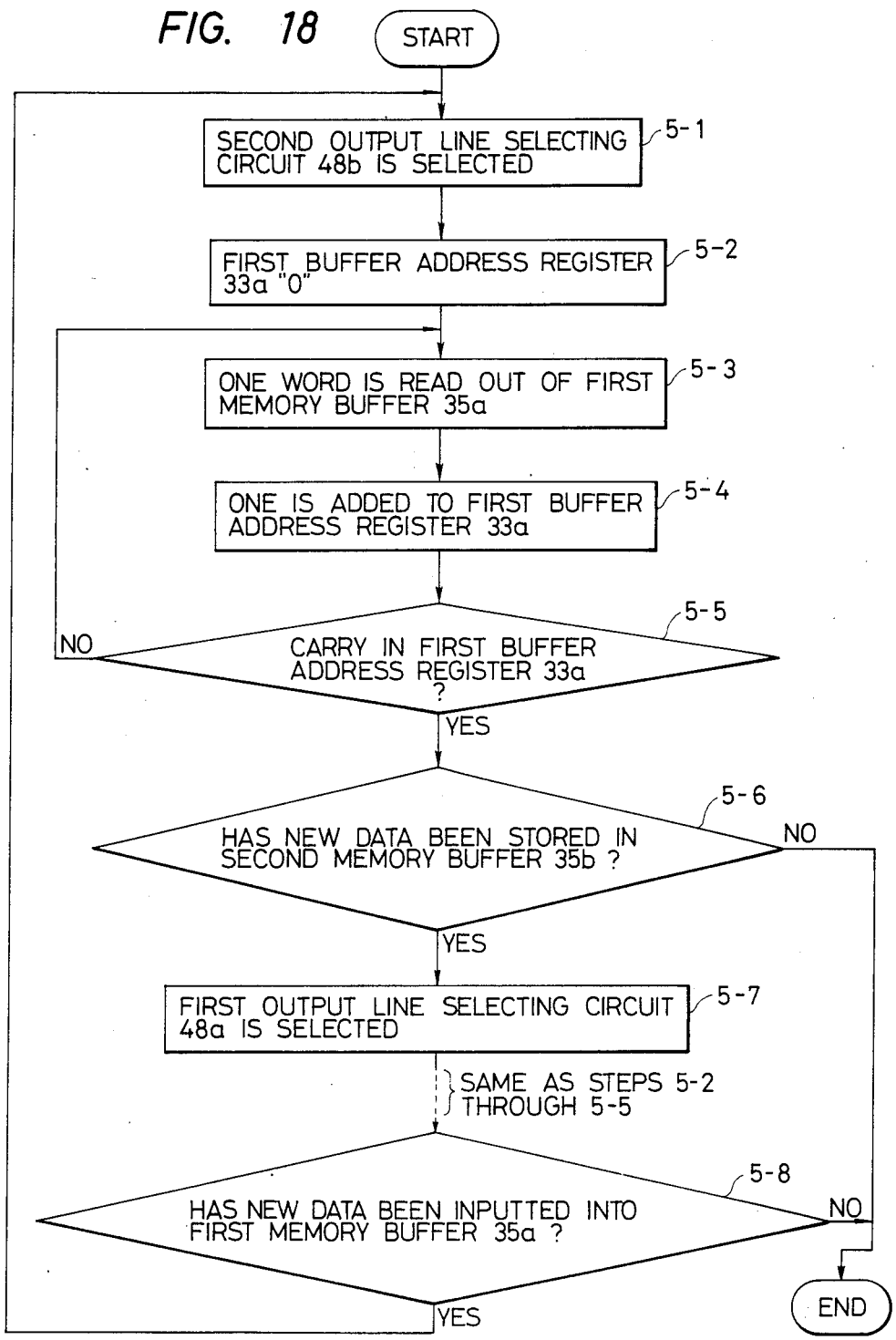

An operation in which the data thus stored in the original form is outputted through the first and second output line selecting circuits 48a and 48b to the P/S converter 49 will be described with reference to the flowchart of FIG. 18.

Step 5-1. The second output line selecting circuit 48b is selected.

Step 5-2. The first buffer address register 33a is cleared to zero.

Step 5-3. One word is read out of the first memory buffer 35a.

Step 5-4. One is added to the content of the first buffer address register 33a.

Step 5-5. It is detected whether or not a carry has occurred in the first buffer address register 33a. If "no", step 5-3 is carried out again. Steps 5-3 and 5-4 are repeatedly performed until a carry is detected. As a result, 256 words in the main scanning direction are read. After this reading operation, the operation in the auxiliary scanning direction is performed, and 256 words in the main scanning operation are read. In this manner, data in the format of 256 words in the main scanning direction and 16 lines in the auxiliary scanning direction is read out of the first memory buffer 35a.

Step 5-6. It is detected whether or not new data has been stored in the second memory buffer 35b. If "no", the operation is ended. If "yes", the next step 5-7 is performed.

Step 5-7. The first output line selecting circuit is selected. Thereafter, the same procedures as those in steps 5-2 through 5-5 are repeated. As a result, data of 256 words in the main scanning direction and 16 lines in the auxiliary scanning direction is read out of the second memory buffer. When all the data has been read out of the second memory buffer 35b, the next step 5-8 is performed.

Step 5-8. It is determined whether or not new data has been inputted to the first memory buffer 35a. If "yes", step 5-1 is repeated. That is, the same procedures are carried out beginning with step 5-1. If "no", the operation is ended.

As described above, the data stored in the first and second memory buffers 35a and 35b is read in the main scanning direction word by word and inputted to the P/S converter 49. When 256 words have been read, the reading operation is shifted in the auxiliary scanning direction, whereupon another 256 words are read in the main scanning direction. In this manner, 16 lines are read in the auxiliary scanning direction. When the image data of one page has been read, the operation is ended.

In the above-described embodiments, a "0" detector 37 and 16-word register 38 are provided. However, the provision of these elements is not always required. That is, the "0" detector 37 may be eliminated if the apparatus is so designed that the CPU detects the "0"s. In addition, the 16-word register may be eliminated if the apparatus is so designed that data is transferred directly between the memory buffers 35a and 35b and the main memory 42.

While examples of an apparatus of the invention have been described with reference to the case where image data is two-dimensionally divided into units each consisting of 16 dots×16 words, it should be noted that the invention is not limited thereto or thereby. That is, in general, the memory buffer should have a capacity of $2^M \times N$, with $2^M \geq P$, where P is the number of words in one line in the main scanning direction and N is the number of lines in the auxiliary scanning direction which form one unit. Thus, instead of the 16-word register 38, in general, an N-word register can be employed.

As is apparent from the above description, according to the invention, two memory buffers having a capacity of $2^M$ words×N lines are provided. While data is being loaded into one of the memory buffers, data is simultaneously being read out of the other. In reading data out of the memory buffer, image data is read in the format of N lines (corresponding to one unit) in the auxiliary scanning direction, and it is detected whether or not the data of each line is all "0"s.

I claim:

1. An image data storage system for storing image data representing an image, said system comprising:

a map memory having a two-dimensional format and being divided into a plurality of (p×q) of memory regions corresponding to (p×q) image units which may or may not contain image information, said image units being obtained by two-dimensionally dividing an image, each of said image units consisting of a matrix of M×N bits, wherein p is the number of image units in the horizontal scanning direction; q, the number of image units in the vertical scanning direction; M, the number of bits in one image unit in the horizontal scanning direction; and N, the number of bits in one image unit in the vertical scanning direction, and a data memory for storing image data representing said image units, each said memory region in said map memory storing a pointer which indicates an address of said data memory at which said image data are stored when image information exists in said one image unit, said map memory storing a predetermined number when no image information exists in said one image unit, wherein said data memory is not accessed for a particular map memory location when said location contains said predetermined number.

2. The image data storage system as claimed in claim 1, further comprising:
   data detecting means, connected to said data memory and said map memory via a memory bus and a register, for detecting whether said image data representing each of said image units are all "0"s.

3. The image storage system as claimed in claim 1, further comprising:
   data generating means, connected to said data memory and said map memory via a memory bus, for generating "0" data as said image data when said image data in each said memory region of said map memory are all "0"s.

4. The image data storage system as claimed in claim 1, wherein said pointer indicates a top address of said data memory
   corresponding to a top position of stack of stored image data comprising the corresponding image unit in a map memory region storing said pointer.

5. The image data storage system as claimed in claim 1, wherein said predetermined number if "0".

6. The image data storage system as claimed in claim 1, further comprising:
   first and second memory buffers, each having a capacity of $2^M \times N$, wherein M is a number such that $2^M \geq P$, wherein P is a number of words contained in each line of image data; and
   means for continuously reading image data, wherein image data stored in one of said first and second memory buffers is read out while storage of the image data is being carried out in the other of said first and second memory buffers.

7. The image data storage system as claimed in claim 3, wherein said "0" data generated by said data generating means is stored in a corresponding memory region of said map memory.

8. A method for operating an image conversion system which includes a buffer to which an image input signal is applied in data words of a predetermined number of data bits, first means for detecting the end of each line in said image input signal, second means for counting an output of said first means to count a number of lines, a map memory which is addressed each time one word of said image input signal is received, a data memory having a plurality of memory areas, each of which corresponds to a respective pointer stored in said map memory, a first pointer register to which a first pointer value of said map memory is inputted, a second pointer register to which a predetermined value is inputted, and third means for setting a new pointer value in said first pointer register, said method comprising the steps of:
   (1) if data of one word applied to said buffer are data other than all "0"s and the corresponding pointer value of said map memory inputted to said first pointer register is "0", storing data of said second pointer register in said map memory and writing the data of said one word in said data memory with said predetermined value as an address;
   (2) if data of said one word applied to said buffer are data other than all "0"s and the corresponding pointer value of said map memory inputted to said first pointer register is not "0", writing the data of said one word into said data memory with said first pointer value as an address;
   (3) if data of said one word applied to said buffer is all "0"s, returning to said step (1) and processing a new data word in said buffer without accessing said map memory and data memory; and
   (4) repeating said steps (1) to (3) the same number of times as a predetermined number of lines for a region of said map memory which corresponds to one unit of an image to be converted.

* * * * *